United States Patent [19]

Yamashita et al.

[11] Patent Number: 5,709,818
[45] Date of Patent: Jan. 20, 1998

[54] LIQUID CRYSTAL COMPOSITION, LIQUID CRYSTAL DEVICE AND LIQUID CRYSTAL APPARATUS

[75] Inventors: Masataka Yamashita, Chigasaki; Masahiro Terada, Hadano; Shosei Mori, Hiratsuka; Syuji Yamada, Atsugi; Hiroshi Mizuno, Zama; Ikuo Nakazawa; Koji Noguchi, both of Atsugi, all of Japan

[73] Assignee: Canon Kabushiki Kaisha, Tokyo, Japan

[21] Appl. No.: 592,159

[22] Filed: Jan. 26, 1996

[30] Foreign Application Priority Data

Jan. 31, 1995 [JP] Japan .................................. 7-032950

[51] Int. Cl.$^6$ .......................... C09K 19/34; C09K 19/32; C09K 19/30; C02F 1/13
[52] U.S. Cl. .................. 252/299.61; 252/299.62; 252/299.63; 252/299.64; 252/299.65; 252/299.66; 349/133; 349/134; 349/172
[58] Field of Search .................. 252/299.01, 299.61, 252/299.62, 299.63, 299.64, 299.65, 299.66; 349/133, 134, 172

[56] References Cited

U.S. PATENT DOCUMENTS

| | | | |
|---|---|---|---|
| 4,367,924 | 1/1983 | Clark et al. | 350/334 |
| 5,091,109 | 2/1992 | Takiguchi et al. | 252/299.61 |
| 5,200,109 | 4/1993 | Iwaki et al. | 252/299.61 |
| 5,385,692 | 1/1995 | Iwaki et al. | 252/299.62 |
| 5,395,551 | 3/1995 | Togano et al. | 252/299.61 |
| 5,413,735 | 5/1995 | Yamashita et al. | 252/299.61 |
| 5,460,749 | 10/1995 | Terada et al. | 252/299.61 |
| 5,462,694 | 10/1995 | Kosaka et al. | 252/299.61 |
| 5,512,209 | 4/1996 | Takiguchi et al. | 252/299.61 |

FOREIGN PATENT DOCUMENTS

| | | |
|---|---|---|
| 606090 | 7/1994 | European Pat. Off. . |
| 0622359 | 11/1994 | European Pat. Off. . |
| 640677 | 3/1995 | European Pat. Off. . |
| 59-193426 | 11/1984 | Japan . |
| 59-193427 | 11/1984 | Japan . |
| 60-031120 | 2/1985 | Japan . |
| 60-156046 | 8/1985 | Japan . |
| 60-156047 | 8/1985 | Japan . |
| 1-140198 | 6/1989 | Japan . |
| 3-252624 | 11/1991 | Japan . |
| 7-010849 | 1/1995 | Japan . |

OTHER PUBLICATIONS

Clark & Lagerwall, Japan Display '86, pp. 456–458 (1986).
Ohuchi et al., Japanese Journal of Appl. Physics, 27(5), 725–728 (1988).
Nakano et al., Japanese Journal of Appl. Physics, 19(10), 2013–2014 (1980).
K. Miyasato et al., Japanese Journal of Appl. Physics, 22(10), L661–663 (1983).

*Primary Examiner*—Shean C. Wu
*Attorney, Agent, or Firm*—Fitzpatrick, Cella, Harper & Scinto

[57] ABSTRACT

A liquid crystal composition contains a mesomorphic compound represented by the following formula (A):

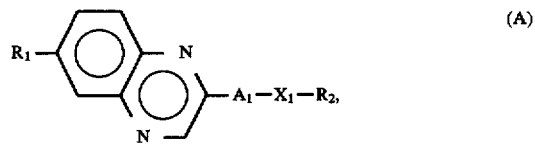

wherein $R_1$ and $R_2$ independently denote a linear or branched alkyl group having 1–18 carbon atoms; $X_1$ denotes a single bond, —O—, —CO—O— or —O—CO—; and $A_1$ denotes

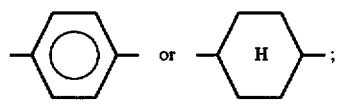

and a mesomorphic compound represented by the following formula (B):

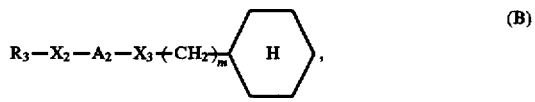

wherein $R_3$ denotes a linear or branched alkyl group having 1–18 carbon atoms; $X_2$ and $X_3$ independently denote a single bond, —O—, —CO—O— or —O—CO—; m is an integer of 3–16; and $A_2$ denotes

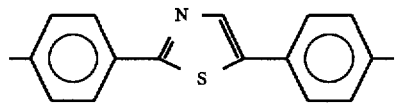

or

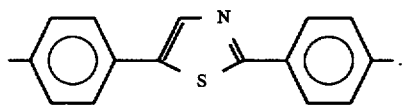

The liquid crystal composition may preferably be formulated as a chiral smectic liquid crystal composition. The liquid crystal composition is useful in providing a liquid crystal device using the liquid crystal composition with a good alignment characteristic, a good drive characteristic, and a high and stable contrast ratio.

15 Claims, 10 Drawing Sheets

C1 ALIGNMENT  $\text{H} + \delta > \alpha$

C2 ALIGNMENT  $\text{H} - \delta > \alpha$

LIQUID CRYSTAL COMPOSITION, LIQUID CRYSTAL DEVICE AND LIQUID CRYSTAL APPARATUS

FIELD OF THE INVENTION AND RELATED ART

The present invention relates to a liquid crystal composition, a liquid crystal device using the composition to be used in a liquid crystal display device or a liquid crystal-optical shutter, etc., and a liquid crystal apparatus using the device. Particularly, the present invention relates to a liquid crystal composition containing two-types of specific mesomorphic compounds in combination, a liquid crystal device using the composition in which the composition is placed in a particular alignment state, and a liquid crystal apparatus using the device.

A display device of the type which controls transmission of light in combination with a polarizing device by utilizing the refractive index anisotropy of ferroelectric (or chiral smectic) liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display based on its excellent function.

Incidentally, Japanese Laid-Open Patent Application (JP-A) 3-252624 has disclosed a method for improving a transmittance (contrast) and also a technique capable of attaining high-speed display in case where such a ferroelectric liquid crystal (composition), particularly a chiral smectic liquid crystal (composition), is utilized for large-area and high-resolution display.

First, the method for providing a high contrast will be explained.

Generally, in a liquid crystal device utilizing birefringence of a liquid crystal, the transmittance under right angle cross nicols is given by the following equation:

$$I/I_0 = \sin^2 4\theta a \cdot \sin^2(\Delta nd/\lambda)\pi,$$

wherein $I_0$: incident light intensity,

I: transmitted light intensity, $\theta a$: apparent tilt angle, $\Delta n$: refractive index anisotropy, d: thickness of the liquid crystal layer, $\lambda$: wavelength of the incident light. The apparent tilt angle $\theta a$ in a non-helical structure is recognized as a half of an angle between the average molecular axis directions of chiral smectic liquid crystal molecules in a twisted alignment (in the thickness direction of the cell or the direction of a normal to the substrate) in a first orientation state and a second orientation state. According to the above equation, it is shown that an apparent tilt angle $\theta a$ of 22.5 degrees provides a maximum transmittance and the apparent tilt angle $\theta a$ in a nonhelical structure for realizing bistability should desirably be as close as possible to 22.5 degrees in order to provide a high transmittance and a high contrast thereby to enhance a display quality.

However, it has been found that an apparent tilt angle $\theta a$ (a half of an angle formed between molecular axes of chiral smectic liquid crystal molecules at two stable states) in a chiral smectic liquid crystal with a non-helical structure obtained by alignment with a uniaxially aligned (or rubbing-treated) polyimide film as an alignment control film in a conventional manner has become smaller as compared with a cone angle Ⓗ (the angle Ⓗ is a half of the apex angle of the cone along which chiral smectic liquid crystal molecules move shown in FIG. 3A or 3B as described below) in the chiral smectic liquid crystal. More specifically, the apparent tilt angle $\theta a$ in a ferroelectric liquid crystal with a non-helical structure was found to be generally on the order of 3–8 degrees, and the transmittance ($I/I_0$) at that time was at most about 3 to 5%.

Incidentally, a smectic liquid crystal generally has a layer structure and, due to a shrinkage of spacing between layers when it causes a transition from smectic A phase (SmA) to chiral smectic C phase (SmC*) on temperature decrease, it assumes a chevron structure as shown in FIG. 2 where the layers 21 are bent at a mid point between a pair of substrates provided with alignment control films 14a and 14b.

There are two alignment states depending on the bending directions as shown in FIG. 2, including a C1 alignment state 22 appearing immediately after transition from a higher temperature phase to SmC* phase and a C2 alignment state 23 which appears in mixture with the C1 alignment state on further cooling. It have been further discovered that in C1 alignment state, two stable states providing a high contrast (hereinafter inclusively called "uniform state") are formed in addition to hitherto-found two stable states providing low contrast (hereinafter inclusively called "twist (or splay) state") wherein liquid crystal directors are twisted between the substrates.

These states can be transformed from one to the other by applying a certain electric field. More specifically, transition between two twist states is caused under application of weak positive and negative pulse electric fields, and transition between two uniform states is caused under application of strong positive and negative pulse electric fields. By using the two uniform states in C1 alignment, it is possible to realize a display device which is brighter and shows a higher contrast than the conventional devices. Accordingly, it is expected that a display with a higher quality can be realized by using a display device wherein the entire display area is formed in C1 alignment state and the high-contrast two states in C1 alignment (C1 uniform state) are used as two states representing white and black display states.

Referring to FIGS. 3A and 3B, directors of liquid crystal molecules in the vicinity of the substrates in the C1 alignment and C2 alignment are disposed on cones 31 shown in FIGS. 3A and 3B, respectively. As is well known, as a result of uniaxial aligning treatment, such as rubbing, liquid crystal molecules contacting a substrate surface form a pretilt angle $\alpha$, the direction of which is such that the liquid crystal molecules 32 raise a forward end up (i.e., are spaced from the substrate surface) in the direction of the rubbing indicated by an arrow A (as shown also in FIG. 2). From the above, it is required that the following relationships are satisfied among a cone angle Ⓗ, the pretilt angle $\alpha$ and a layer inclination angle $\alpha$ (an angle formed between the smectic layer line and a normal to the substrate):

Ⓗ+δ>α in C1 alignment, and

Ⓗ−δ>α in C2 alignment.

Accordingly, the condition for preventing the formation of C2 alignment but allowing C1 alignment is Ⓗ−δ<α, that is $$H < \alpha + \delta \qquad (I)$$

Further, from simple consideration of a torque acting on a liquid crystal molecule at a boundary surface in switching from one position to the other position under an electric field, the relationship of $$\alpha > \delta \qquad (II)$$

is given as a condition for easy switching of such a liquid crystal molecule at the boundary.

Accordingly, in order to form the C1 alignment more stably, it is effective to satisfy the condition (II) in addition to the condition (I).

From further experiments under the conditions of (I) and (II), the apparent tilt angle θa is increased from 3–8 degrees obtained when the above conditions (I) and (II) are not satisfied to 8–16 degrees when the above conditions (I) and (II) are satisfied, and also an empirical relationship of $$H > \theta a > H/2 \qquad (III)$$

has been also found between the cone angle H and apparent tilt angle θa.

As described above, it has been clarified that the satisfaction of the conditions (I), (II) and (III) provides a display device capable of displaying a high-contrast image.

The liquid crystal device according to the present invention may preferably include specific alignment control layers disposed on both opposite surfaces of the pair of substrates. Further, at least one of the alignment control layers may preferably be subjected to a uniaxial aligning treatment for aligning liquid crystal molecules in one direction, so that the respective uniaxial alignment axes may preferably be parallel to each other or intersect with each other at a prescribed crossing angle to control an alignment state of the liquid crystal molecules. In this instances, the resultant liquid crystal device may suitably satisfy the above C1 uniform conditions (I), (II) and (III).

In order to further stably form the above-mentioned C1 alignment state and uniform alignment state to provide a good alignment state (C1 uniform alignment state), the above-described crossing angle may preferably be in a prescribed range.

Secondly, the technique enabling high-speed display will be explained.

A display apparatus using a chiral smectic liquid crystal can realize a large screen and a high resolution which by far exceed those attained by conventional CRT and TN-type liquid crystal displays. However, as the screen size and resolution are increased, the frame frequency (frequency constituting one picture) becomes low. This leads to a problem that the picture-rewriting speed becomes slow and the motion picture display speed becomes slow, e.g., in cases of smooth scrolling and cursor movement on character editing or a graphic screen. A solution to this problem has been given in, e.g., JP-A 60-31120 and JP-A 1-140198.

More specifically, there has been disclosed a display apparatus including a display panel comprising scanning electrodes and data electrodes arranged in a matrix, whole-area writing means for selecting all or a prescribed part of the scanning electrodes for writing and partial writing means for selecting a part of the above-mentioned all or a prescribed part of the scanning electrodes. As a result, a partial motion picture display can be performed at a high speed by the partial writing mode, and the partial writing and the whole-area writing can be performed compatibly.

A simple matrix-type display apparatus using a liquid crystal device including a (chiral smectic or ferroelectric) liquid crystal composition disposed between a pair of substrates as described above may be driven by driving methods as disclosed by, e.g., JP-A 59-193426, JP-A 59-193427, JP-A 60-156046 and JP-A 60-156047.

FIGS. 6A and 6B are waveform diagrams showing an example set of driving waveforms used in such a driving method. FIG. 5 is a plan view showing an electrode matrix used in a chiral smectic liquid crystal panel 51 of a simple matrix-type. The liquid crystal panel 51 shown in FIG. 5 includes scanning electrodes 52 and data electrodes 53 intersecting each other so as to constitute a pixel at each intersection together with a chiral smectic liquid crystal disposed between the scanning electrodes 52 and data electrodes 53.

Referring to FIG. 6A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 6B shows a time-serial waveform used for providing a display state as shown in FIG. 7.

In the driving embodiment shown in FIGS. 6A and 6B, a minimum duration Δt of a single polarity voltage applied to a pixel on a selected scanning line corresponds to the period of a writing phase $t_2$, and the period of a one-line clearing phase $t_1$ is set to 2Δt.

The parameters $V_S$, $V_I$ and Δt in the driving waveforms shown in FIGS. 6A and 6B are determined depending on switching characteristics of a liquid crystal material used.

FIG. 8 shows a V–T characteristic, i.e., a change in transmittance T when a driving voltage denoted by ($V_S$+$V_I$) is changed while a bias ratio as mentioned hereinbelow is kept constant. In this embodiment, the parameters are fixed at constant values of Δt=50 μs and a bias ratio $V_I/(V_I+V_S)$ =⅓. On the right side of FIG. 8 is shown a result when the voltage ($I_N$–$S_S$) shown in FIG. 6A is applied to a pixel concerned, and on the left side of FIG. 8 is shown a result when the voltage ($I_S$–$S_S$) is applied to a pixel concerned, respectively while increasing the voltage ($V_S$+$V_I$). On both sides of the ordinate, the absolute value of the voltage ($V_S$+$V_I$) is separately indicated. At ($I_N$–$S_S$) and ($I_S$–$S_S$), a previous (display) state is cleared by applying a voltage $V_R$ and a subsequent (display) state is determined by voltages $V_B^1$ and $V_B^2$, respectively. Referring to FIG. 8, a relationship of $V_2 < V_1 < V_3$ holds. The voltage $V_1$ may be referred to as a threshold voltage in actual drive and the voltage $V_3$ may be referred to as a crosstalk voltage. More specifically, as shown in FIG. 6A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. In an actual drive, $\Delta V = (V_3 - V_1)$ provides a range of $|V_S + V_I|$ allowing a matrix drive and may be referred to as a drive voltage margin (or drive margin), which is preferably large enough. It is of course possible to increase the value of $V_3$ and thus ΔV (=$V_3 - V_1$) by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about ⅓–¼ was practical. On the other hand, when the bias ratio is fixed, the voltage margin ΔV strongly depends on the switching characteristics of a liquid crystal material used, and it is needless to say that a liquid crystal material providing a large ΔV is very advantageous for matrix drive.

The upper and lower limits of application voltages and a difference therebetween (driving voltage margin ΔV) by which selected pixels are written in two states of "black" and "white" and nonselected pixels can retain the written "black" and "white" states at a constant temperature as described above, vary depending on and are inherent to a particular liquid crystal material used. Further, the driving margin is deviated according to a change in environmental temperature, so that optimum driving conditions should be required of an actual display apparatus in view of a liquid crystal material used, a device structure and an environmental temperature.

As described above, when a liquid crystal device using a liquid crystal composition which satisfies the above conditions (I), (II) and (III) is driven according to the above-mentioned partial writing scheme, it becomes possible to realize a large-area and high-resolution display with a high contrast and at high speed.

Incidentally, in case where a practical display device is used in its operation temperature range of about 5°–35° C., the display device per se is placed in an environmental temperature range of about 10°–50° C. due to accumulation or storage of heat from peripheral equipment. It is a present state that an ordinary display device using a chiral smectic liquid crystal showing ferroelectricity fails to retain a good image quality in all the temperature range (10°–50° C). Particularly in case where a liquid crystal composition prepared by controlling a magnitude of a layer inclination angle θ so as not to monotonously increase on temperature decrease (i.e., toward a low temperature side), it is a serious problem that a sufficient drive (voltage) margin is ensured at a low temperature side (e.g., at 0°–5° C.).

More specifically, even when good images with a high contrast can be realized at a temperature in the vicinity by providing a C1 uniform alignment state, a region assuming a C2 alignment state appears at a low temperature during a matrix drive in some cases. For this reason, it is difficult to say that good images and a sufficient drive margin are realized in all the environmental temperature or operation temperature range since a drive margin at that time is largely lowered at a low temperature.

Further, in case where the above-mentioned liquid crystal display device is driven by applying a voltage, an irregularity in contrast (ununiform contrast) due to a difference in degree of uniform alignment state of liquid crystal molecules is caused to occur, thus impairing uniformity of display quality in some cases.

More specifically, when a liquid crystal device wherein liquid crystal molecules assumes a C1 uniform alignment state as described above is observed through a polarizing microscope (of above several ten magnifications), linear defects 60 (defects in the form of line or streak) as schematically illustrated in FIG. 11 are confirmed in a direction substantially parallel to a uniaxially aligning treatment direction shown by an arrow. Referring to FIG. 11, a minute alignment region A and a minute alignment region B are divided from each other by a linear defect 60. In the alignment regions A and B, liquid crystal molecules generally show different apparent tilt angles and provide different molecular axes each giving the darkest state to form a prescribed angle (deviation angle). When a deviation angle is at most 1 degree, a resultant alignment state is generally said to show a good monodomain characteristic, thus resulting in good uniformity of alignment and molecular axis giving the darkest state over the entire display area of the liquid crystal device. In this case, a resultant contrast principally varies depending on a degree of fluctuation of liquid crystal molecules due to a successively applied data signal voltage in a non-selection period at the time of matrix drive.

On the other hand, when a deviation angle of at least 2 degrees, a resultant alignment state is considered as an alignment state having an inferior monodomain characteristic. In this instance, even if a degree of fluctuation of liquid crystal molecules is identical level among minute alignment regions, a region providing a lower contrast appears in many cases since the direction of a molecular axis varies every minute alignment region, thus impairing uniformity of display quality.

SUMMARY OF THE INVENTION

An object of the present invention is to provide a liquid crystal composition, having solved the above-mentioned problems, providing good performances including C1 uniform aligning characteristic, contrast and drive voltage margin.

More specifically, a principal object of the present invention is to provide a liquid crystal composition not including a region in a C2 alignment state in a low temperature range during a matrix drive to suppress a decrease in drive voltage margin and capable of providing a deviation angle of at most 1 degree to show a good monodomain characteristic and uniformity of molecular axis giving the darkest state, thus minimizing an irregularity in contrast within the entire display area even when a magnitude of a layer inclination angle θ is controlled not to monotonously increase on a low temperature side by incorporating specific mesomorphic compounds in combination into a resultant liquid crystal composition.

Another object of the present invention is to provide a liquid crystal device using the liquid crystal composition and a liquid crystal apparatus using the liquid crystal device together with a drive circuit for driving the device and a light source therefor.

According to the present invention, there is provided a liquid crystal composition, comprising:

a mesomorphic compound represented by the following formula (A):

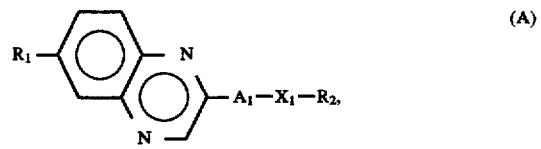

(A)

wherein $R_1$ and $R_2$ independently denote a linear or branched alkyl group having 1–18 carbon atoms; $X_1$ denotes a single bond, —O—, —CO—O— or —O—CO—; and $A_1$ denotes

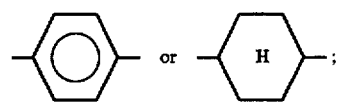

and a mesomorphic compound represented by the following formula (B):

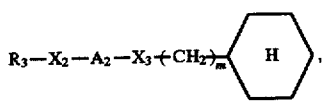 (B)

wherein $R_3$ denotes a linear or branched alkyl group having 1-18 carbon atoms; $X_2$ and $X_3$ independently denote a single bond, —O—, —CO—O— or —O—CO—; m is an integer of 3-16; and $A_2$ denotes

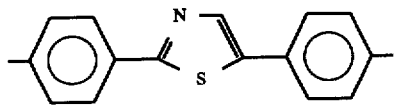

or

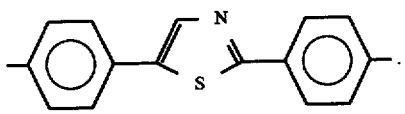

According to the present invention, there is also provided a liquid crystal device, comprising: a pair of substrates each provided with an electrode, and the above-described liquid crystal composition.

According to the present invention, there is further provided a liquid crystal apparatus, including the above-mentioned liquid crystal device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
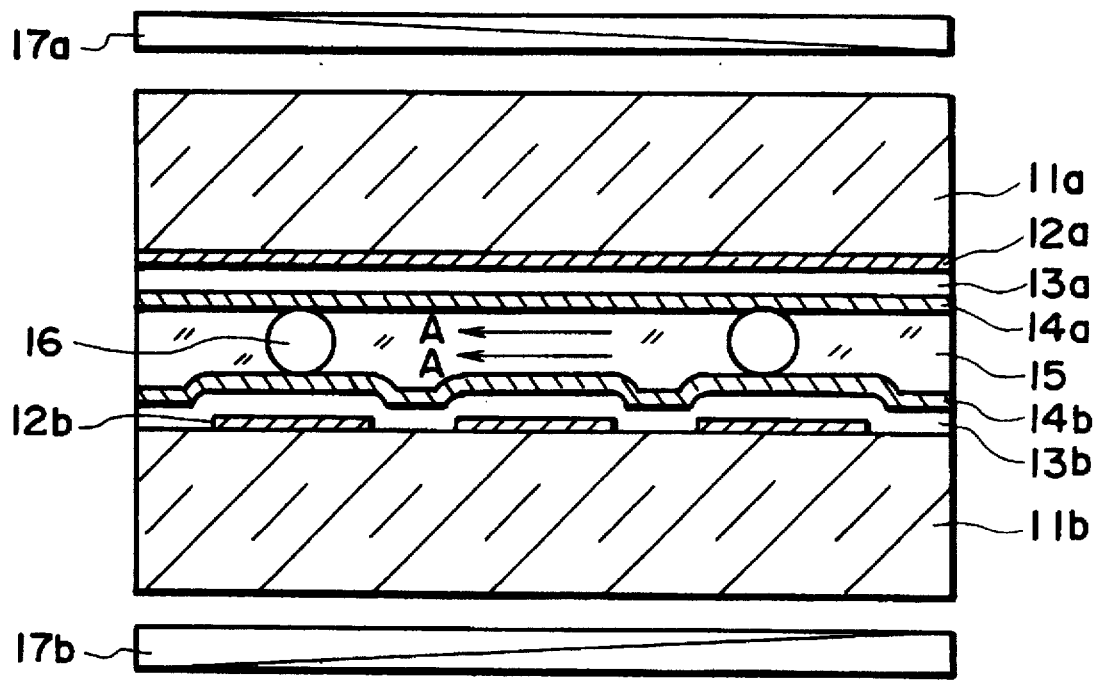
FIG. 1 is a schematic sectional view of an embodiment of the liquid crystal device according to the present invention.
Figure 2:
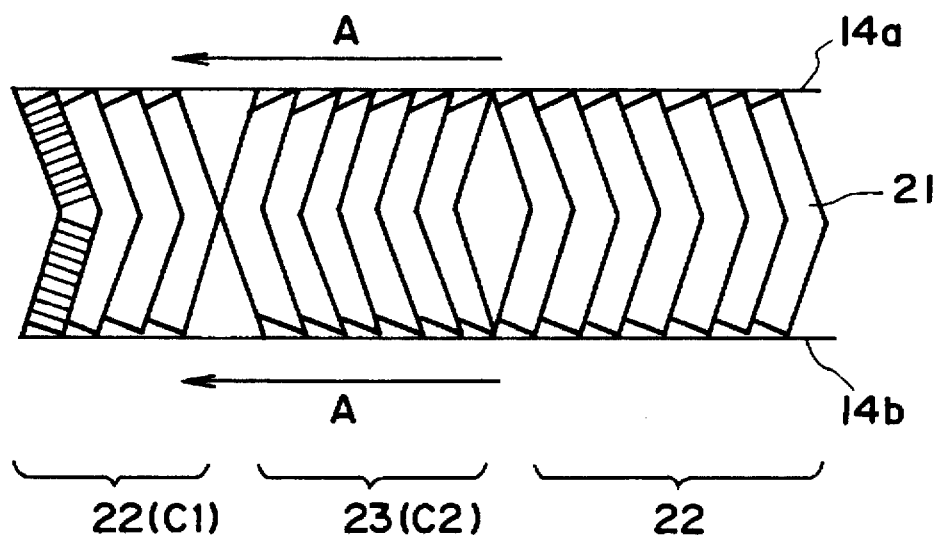
FIG. 2 is an illustration of C1 and C2 alignment states.
Figure 3A:
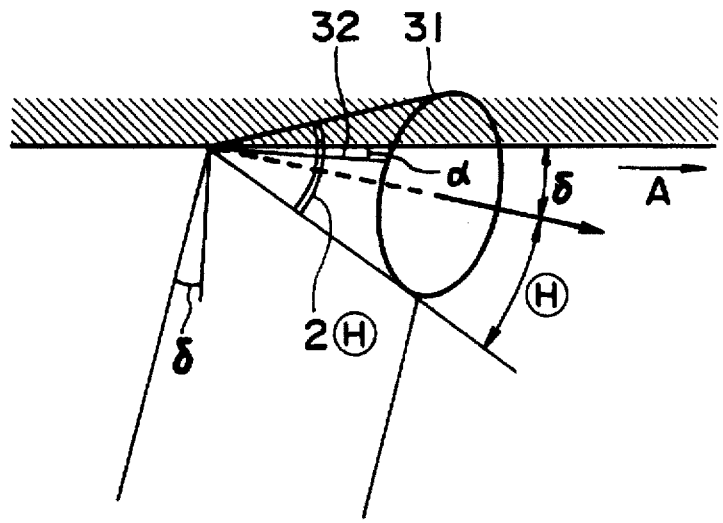
FIGS. 3A and 3B are illustrations of relationship among a cone angle, a pretilt angle and a layer inclination angle in C1 alignment and C2 alignment, respectively.
Figure 3B:
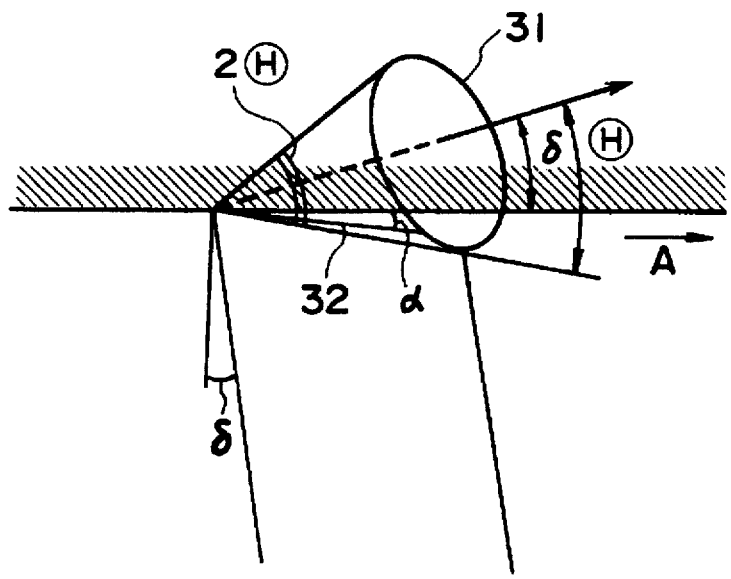

The liquid crystal composition according to the present invention contains at least two essential components including the above-mentioned mesomorphic compounds of the formula (A) and the formula (B).

Herein, the term "mesomorphic compound" means not only a compound showing a mesomorphic (or liquid crystal) phase by itself but also a compound not showing a mesomorphic phase as long as a resultant liquid crystal composition containing the compound shows a mesomorphic phase.

The liquid crystal composition of the present invention may preferably contain at least one optically active compound to assume chiral smectic phase, thus functioning as a ferroelectric liquid crystal composition.

The liquid crystal composition characterized by a specific combination of mesomorphic compounds of the formulae (A) and (B) is effective in improving various display and drive characteristics. The reason has not been clarified as yet but this may attributable to the interaction between a quinoxaline skeleton of the mesomorphic compound of the formula (A) and a terminal cyclohexyl group connected to a central core structure having a thiazole ring and benzene ring by an alkylene group of the mesomorphic compound of the formula (B), thus improving uniformity of alignment, a drive voltage margin and a contrast.

The mesomorphic compound represented by the formula (A) may generally be synthesized through a process as shown in, e.g., JP-A 7-10849 (corr. to EP-A-0622359).

Hereinbelow, preferred specific examples of the mesomorphic compound of the formula (A) may include those shown below, respectively.

In the following, for simplicity, the respective groups are indicated as follows.

| | | |
|---|---|---|
| met = $CH_3$, | hep = $C_7H_{15}$, | trd = $C_{13}H_{27}$, |
| eth = $C_2H_5$, | oct = $C_8H_{17}$, | ted = $C_{14}H_{29}$, |
| pro = $C_3H_7$, | non = $C_9H_{19}$, | ped = $C_{15}H_{31}$, |
| but = $C_4H_9$, | dec = $C_{10}H_{21}$, | hexd = $C_{16}H_{33}$, |
| pen = $C_5H_{11}$, | und = $C_{11}H_{23}$, | hepd = $C_{17}H_{35}$, |
| hex = $C_6H_{13}$, | dod = $C_{12}H_{25}$, | ocd = $C_{18}H_{37}$, |
| 2mb = 2-methylbutyl. | | |

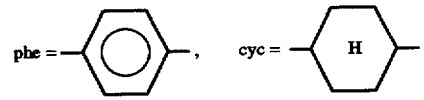

Formula (A):

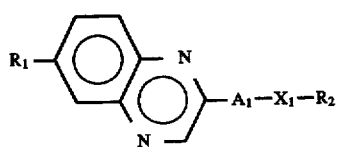

| Ex. Comp. No. | $R_1-$ | $-A_1-$ | $-X_1-$ | $-R_2$ |
|---|---|---|---|---|
| A-1 | met- | -phe- | — | -but |
| A-2 | pro- | -phe- | — | -hex |
| A-3 | hex- | -phe- | — | -oct |
| A-4 | oct- | -phe- | — | -oct |
| A-5 | dec- | -phe- | — | -oct |
| A-6 | und- | -phe- | — | -dec |
| A-7 | dod- | -phe- | — | -dec |

Formula (A):

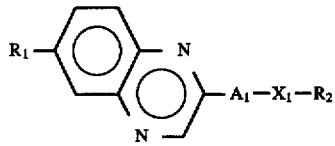

| Ex. Comp. No. | R₁– | –A₁– | –X₁– | –R₂ |
|---|---|---|---|---|
| A-8  | ted-  | -phe- | —      | -dec  |
| A-9  | ocd-  | -phe- | —      | -dec  |
| A-10 | dec-  | -phe- | —      | -dec  |
| A-11 | oct-  | -phe- | —      | -dec  |
| A-12 | hex-  | -phe- | —O—    | -dec  |
| A-13 | oct-  | -phe- | —O—    | -dec  |
| A-14 | dec-  | -phe- | —O—    | -dec  |
| A-15 | hex-  | -phe- | —      | -dec  |
| A-16 | oct-  | -phe- | —      | -dod  |
| A-17 | oct-  | -phe- | —      | -ocd  |
| A-18 | hex-  | -phe- | —COO—  | -oct  |
| A-19 | oct-  | -phe- | —COO—  | -oct  |
| A-20 | dec-  | -phe- | —COO—  | -oct  |
| A-21 | hex-  | -phe- | —OOC—  | -oct  |
| A-22 | oct-  | -phe- | —OOC—  | -oct  |
| A-23 | dec-  | -phe- | —OOC—  | -oct  |
| A-24 | hex-  | -cyc- | —      | -und  |
| A-25 | oct-  | -cyc- | —      | -und  |
| A-26 | dec-  | -cyc- | —      | -dod  |
| A-27 | dod-  | -cyc- | —      | -dod  |
| A-28 | 2mb-  | -phe- | —      | -oct  |
| A-29 | oct-  | -phe- | —O—    | -2mb  |
| A-30 | oct-  | -phe- | —      | -pen  |
| A-31 | oct-  | -phe- | —      | -hep  |
| A-32 | but-  | -phe- | —      | -dec  |
| A-33 | but-  | -phe- | —      | -dod  |
| A-34 | hex-  | -phe- | —      | -dec  |
| A-35 | hex-  | -phe- | —      | -dod  |
| A-36 | oct-  | -phe- | —      | -hex  |
| A-37 | oct-  | -phe- | —      | -dod  |
| A-38 | oct-  | -phe- | —OOC—  | -dod  |

The mesomorphic compound represented by the formula (B) may generally be synthesized through a process as shown in, e.g., JP-A 7-118178 (corr. to EP-A-0640677 and U.S. Pat. No. 5462694).

Hereinbelow, preferred specific examples of the mesomorphic compound of the formula (B) may include those shown below, respectively.

In the following, for simplicity, the respective groups are indicated similarly as a in those for the formula (A) except for the following groups.

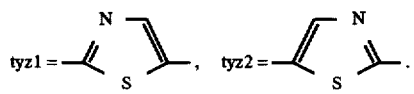

Formula (B):

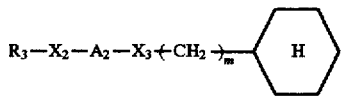

| Ex. Comp. No. | R₃ | X₂ | A₂ | X₃ | m |
|---|---|---|---|---|---|
| B-1 | met | — | -phe-tyz1-phe- | — | 3 |
| B-2 | but | — | -phe-tyz1-phe- | — | 3 |
| B-3 | hex | — | -phe-tyz1-phe- | — | 4 |
| B-4 | oct | — | -phe-tyz1-phe- | — | 4 |
| B-5 | dec | — | -phe-tyz1-phe- | — | 4 |
| B-6 | und | — | -phe-tyz1-phe- | — | 4 |
| B-7 | dod | — | -phe-tyz1-phe- | — | 4 |
| B-8 | ted | — | -phe-tyz1-phe- | — | 4 |
| B-9 | ocd | — | -phe-tyz1-phe- | — | 4 |
| B-10 | oct | — | -phe-tyz1-phe- | —O— | 4 |
| B-11 | dec | — | -phe-tyz1-phe- | —O— | 5 |
| B-12 | dod | — | -phe-tyz1-phe- | —O— | 7 |
| B-13 | oct | — | -phe-tyz1-phe- | —COO— | 5 |
| B-14 | hex | — | -phe-tyz1-phe- | —OOC— | 8 |
| B-15 | hex | —O— | -phe-tyz1-phe- | — | 4 |
| B-16 | oct | —O— | -phe-tyz1-phe- | — | 4 |
| B-17 | dec | —O— | -phe-tyz1-phe- | — | 4 |
| B-18 | ted | —O— | -phe-tyz1-phe- | — | 4 |
| B-19 | dec | —COO— | -phe-tyz1-phe- | — | 5 |
| B-20 | dec | —OOC— | -phe-tyz1-phe- | —O— | 5 |
| B-21 | oct | — | -phe-tyz1-phe- | — | 8 |
| B-22 | dec | — | -phe-tyz1-phe- | — | 10 |
| B-23 | hex | — | -phe-tyz1-phe- | — | 14 |
| B-24 | oct | — | -phe-tyz1-phe- | — | 16 |
| B-25 | oct | — | -phe-tyz2-phe- | — | 3 |
| B-26 | oct | — | -phe-tyz2-phe- | — | 4 |
| B-27 | hex | — | -phe-tyz2-phe- | — | 5 |
| B-28 | dec | — | -phe-tyz2-phe- | — | 5 |
| B-29 | dec | — | -phe-tyz2-phe- | —O— | 6 |
| B-30 | hep | —OOC— | -phe-tyz2-phe- | — | 5 |
| B-31 | 2mb | — | -phe-tyz1-phe- | — | 5 |

The liquid crystal composition according to the present invention may preferably be prepared by mixing 0.1–30 wt. % in total of at least one species of a mesomorphic compound of the formula (A), 0.1–30 wt. % in total of at least one species of a mesomorphic compound of the formula (B), and at least one species of another mesomorphic compound (or liquid crystal composition) capable of including an optically active compound in an appropriate mixing ratio set for providing desired characteristics including contrast level, drive margin parameter, alignment state, etc.

If the mesomorphic compounds of the formulae (A) and (B) are each contained in the liquid crystal composition in an amount of below 0.1 wt. %, respectively, the resultant liquid crystal composition fails to provide desired effects.

Above 30 wt. %, the resultant liquid crystal composition impairs other properties. More specifically, in this case, the resultant liquid crystal composition fails to provide a desired phase transition series and a sufficient compatibility of respective components and shows a high viscosity in some cases.

For this reason, in order to stably attain desired effects while not largely impairing other properties, the liquid crystal composition of the present invention may more preferably contain 0.1–20 wt. %, particularly 0.5–15 wt. %, of a mesomorphic compound of the formula (A) and 0.1–20 wt. %, particularly 0.5–15 wt. %, of a mesomorphic compound of the formula (B).

The above optically active compound may preferably be a mesomorphic compound represented by the above-described formula (A) or (B) or an optically active compound having a central skeleton containing benzene ring and pyrimidine ring.

The above-mentioned another mesomorphic compound (or another liquid crystal composition) may preferably be constituted by at least one species of mesomorphic compounds represented by the formulae (1), (2), (3), (4) and/or (5) shown below. In this case, each component of another mesomorphic compound may preferably be contained in the liquid crystal composition in an amount shown below:

(a) 20–75 wt. % for the mesomorphic compound of the formula (1),
(b) 5–25 wt. % for the mesomorphic compound of the formula (2),
(c) 5–30 wt. % for the mesomorphic compound of the formula (3),
(d) 0.1–30 wt. % for the mesomorphic compound of the formula (4), or
(e) 1–25 wt. % for the mesomorphic compound of the formula (5).

The above-mentioned another mesomorphic compound of the formulae (1) to (5) may include those shown below:

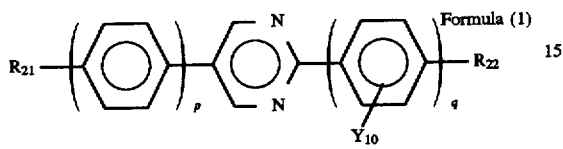
Formula (1)

wherein p and q independently denote 0, 1 or 2 satisfying p+q=1 or 2; $Y_{10}$ is hydrogen or fluorine; and $R_{21}$ and $R_{22}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other;

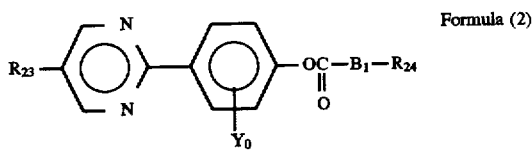
Formula (2)

wherein $B_1$ is

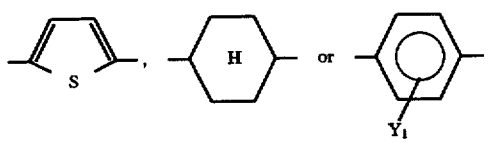

where $Y_1$ is hydrogen or fluorine; $Y_0$ is hydrogen or fluorine; $R_{23}$ is a linear or branched alkyl group having 1–18 carbon atoms; $R_{24}$ is hydrogen, halogen, CN, or a linear or branched alkyl group having 1–18 carbon atoms; and at least one methylene group in the alkyl group of $R_{23}$ or $R_{24}$ can be replaced by —O—, —S—, —CO—, —CH=CH—, —C≡C—, or —CHW— where W is halogen, CN or $CF_3$ provided that heteroatoms are not adjacent to each other;

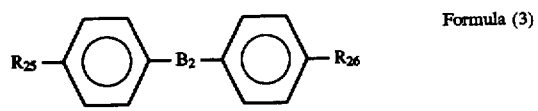
Formula (3)

wherein $B_2$ is

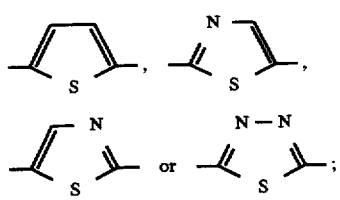

and $R_{25}$ and $R_{26}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other;

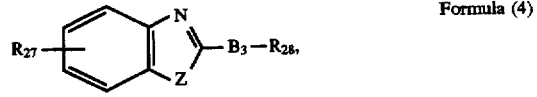
Formula (4)

wherein $B_3$ is

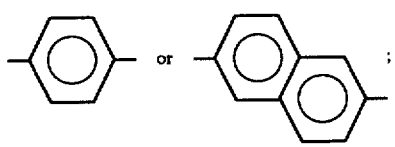

and $R_{27}$ and $R_{28}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other; and

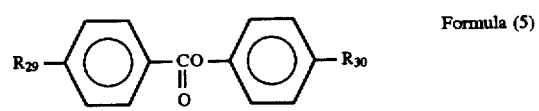
Formula (5)

wherein $R_{29}$ and $R_{30}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other.

In the above formulae (1) to (5), the respective groups $R_{21}$–$R_{30}$ may be an optically active or optically inactive.

With respect to the above another mesomorphic compound of the formulae (1)–(4), examples of the mesomorphic compound of the formula (1) may preferably include those of the formulae (1-1) to (1-7); examples of the mesomorphic compound of the formula (2) may preferably include those of the formulae (2-1) to (2-5); examples of the mesomorphic compound of the formula (3) may preferably include those of the formulae (3-1) to (3-9); and examples of the mesomorphic compound of the formula (4) may preferably include those of the formula (4-1) to (4-6), respectively shown below:

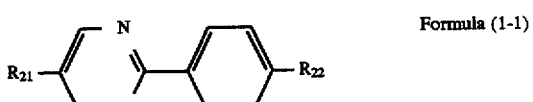
Formula (1-1)

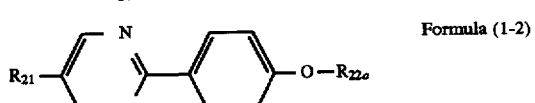
Formula (1-2)

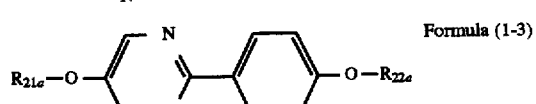
Formula (1-3)

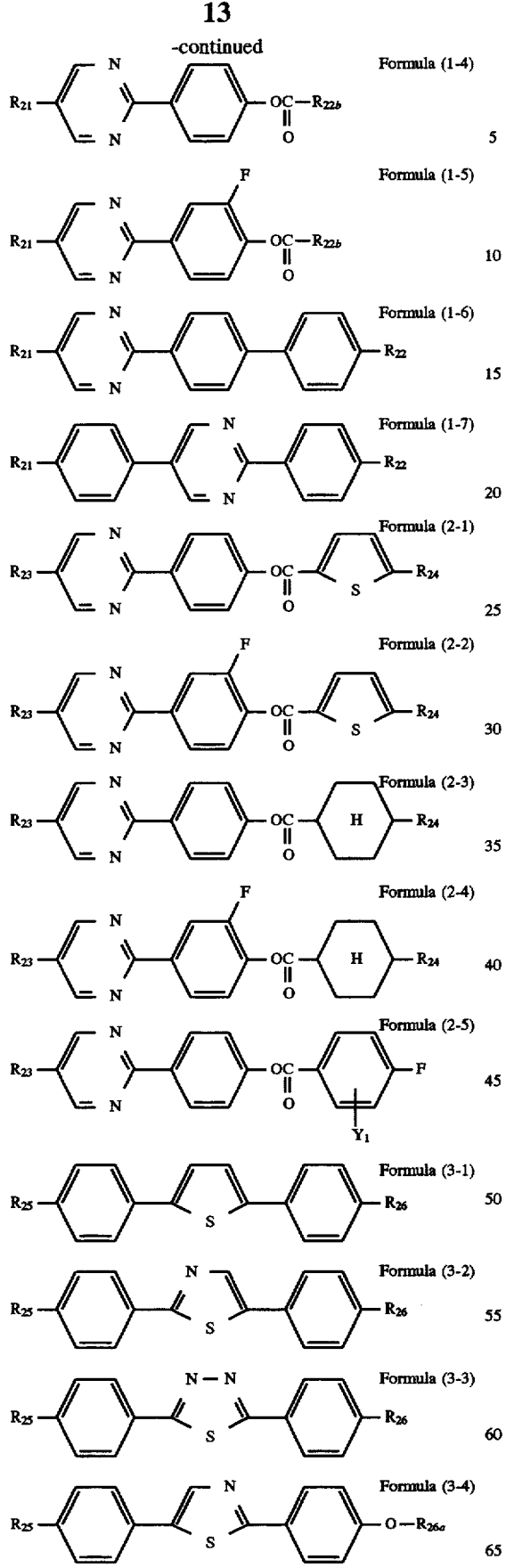
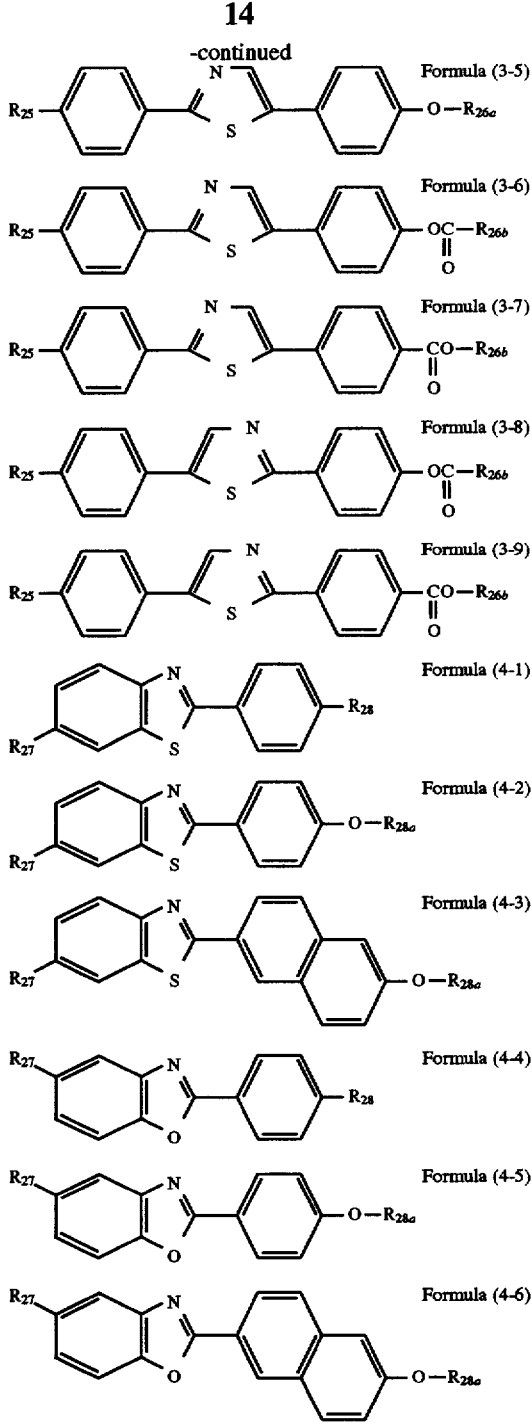

In the above formulae (1-1) to (4-6), $R_{21}$ to $R_{28}$ and $Y_1$ have the same meanings as defined above. Further, $R_{21a}$, $R_{22a}$, $R_{26a}$ and $R_{28a}$ independently denote a linear or branched alkyl group having 1–17 carbon atoms; and $R_{22b}$ and $R_{26b}$ independently denote a linear or branched alkyl group having 1–16 carbon atoms.

The mesomorphic compounds of the formulae (1-1) to (4-6) may be used singly or in combination of two or more species.

In the above formulae (1-1)–(1-5), $R_{21}$ may preferably be a linear alkyl group having 4–14 carbon atoms and $R_{22}$ may preferably be a linear alkyl group having 4–12 carbon atoms. Further, in the above formulae (1-6) and (1-7), $R_{21}$ may preferably be a linear alkyl group having 4–14 carbon atoms and $R_{22}$ may preferably be a linear alkyl group having 4–10 carbon atoms.

In the above formulae (2-1)–(2-5), $R_{23}$ may preferably be a linear alkyl group having 4–14 carbon atoms and $R_{24}$ may preferably be a linear alkyl group having 2–10 carbon atoms.

In the above formulae (3-1)–(3-9), $R_{25}$ may preferably be a linear alkyl group having 2–10 carbon atoms and $R_{26}$ may preferably be a linear alkyl group having 2–12 carbon atoms.

In the above formulae (4-1)–(4-6), $R_{27}$ may preferably be a linear alkyl group having 2–10 carbon atoms and $R_{28}$ may preferably be a linear alkyl group having 4–12 carbon atoms.

The liquid crystal composition of the present invention may preferably assume a chiral smectic phase, particularly a chiral smectic C phase. Further, in order to provide a good uniform alignment to obtain a monodomain state when included in a liquid crystal device. The liquid crystal composition may preferably have phase transition series including an isotropic phase, a cholesteric (chiral nematic) phase, a smectic A phase, and a chiral smectic phase (particularly, a chiral smectic C phase) on temperature decrease.

When the liquid crystal composition assumes a chiral smectic C phase, the liquid crystal composition may preferably have a layer inclination angle θ (which is an inherent property of a chiral smectic liquid crystal material) of 3–15 degrees, preferably 3–12 degrees, in a temperature range of 0°–60° C.

The liquid crystal device according to the present invention may be constituted by disposing the above-described liquid crystal composition, particularly a chiral smectic liquid crystal composition between a pair of substrates each provided with an electrode for applying a voltage to the liquid crystal composition (herein, sometimes referred to as "electrode plate"). At least one (either one or both) of the electrode plates may preferably be provided with an alignment control layer for controlling an alignment state of the liquid crystal composition. The alignment control layer may be subjected to aligning treatment (e.g., rubbing) as desired.

The device according to the present invention may preferably provides a pretilt angle α and the liquid crystal composition (preferably a chiral smectic liquid crystal composition) may preferably be placed in such an alignment state that the chiral smectic liquid crystal shows a cone angle (H), a layer inclination angle δ in chiral smectic C phase, and an apparent tilt angle θa satisfying the following relationships (I), (II) and (III) in a temperature range of 0°–60° C., particularly at around room temperature (e.g., 30° C.), in combination with the pretilt angle α:

$$H < \alpha + \delta \quad (I)$$

$$\delta < \alpha, \quad (II)$$

and $$H > \theta a > H/2 \quad (III)$$

The liquid crystal device according to the present invention may preferably include specific alignment control layers disposed on both opposite surfaces of the pair of substrates. Further, at least one of the alignment control layers may preferably be subjected to a uniaxial aligning treatment for aligning liquid crystal molecules in one direction, so that the respective uniaxial alignment axes may be parallel to each other or preferably intersect with each other at a prescribed crossing angle to control an alignment state of the liquid crystal molecules. In this instances, the liquid crystal device may preferably satisfy the above C1 uniform conditions (I), (II) and (III).

In order to further stably form the above-mentioned C1 alignment state and uniform alignment state to provide a good alignment state (C1 uniform alignment state), the above-described crossing angle may preferably be in a range of above 0 degrees to at most 25 degrees, more preferably 1–25 degrees. Further, the liquid crystal device may preferably provide a pretilt angle of at least 5 degrees.

A preferred embodiment of the liquid crystal device will now be described with reference to FIG. 1 which is a schematic sectional view of the device. Referring to FIG. 1, the device includes a pair of substrates (glass plates) 11a and 11b coated with transparent electrodes 12a and 12b, respectively, of $In_2O_3$, $SnO_2$, ITO (indium tin oxide), etc., then successively further coated with insulating films 13a and 13b and alignment control films, respectively.

The insulating films 13a and 13b may comprise a film of an inorganic substance or an organic substance as shown hereinbelow. Examples of such an inorganic substance may include silicon nitride, silicon carbide containing hydrogen, silicon oxide, boron nitride, boron nitride containing hydrogen, cerium oxide, aluminum oxide, zirconium oxide, titanium oxide, and magnesium fluoride.

The insulating film 13a or 13b may be formed in a single layer or plural layers, as desired, and has a short circuit-preventing function between opposite substrates (opposite electrode). On the insulating film 13a or 13b, it is possible to form a coating-type insulating layer of, e.g., Ti—Si by a coating method. Further, in order to prevent liquid crystal movement at the time of driving a liquid crystal device, the insulating film 13a or 13b may comprise an insulating coating film containing insulating beads, such as silica beads by which the alignment control film formed thereon can be roughened to provide the alignment control film with an uneven or roughened surface (not shown).

The alignment control films 14a and 14b may comprise a film of an organic substance or inorganic substance as shown above. Examples of such an organic substance may include polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin.

These insulating films 13a and 13b and alignment control films 14a and 14b may be formed in a single layer of an inorganic or organic insulating alignment control layer as desired.

The alignment control films 14a and 14b may be formed, e.g., by applying and baking a polyamide acid (polyimide precursor) represented by the following formula:

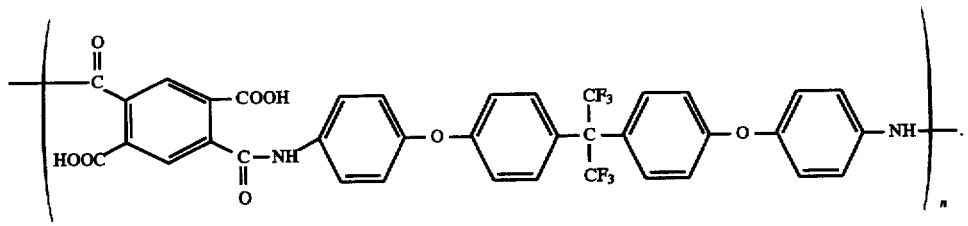

The alignment control film 14a or 14b may be formed in a single layer or plural layers. Further, at least one of such an alignment control films may be subjected to aligning treatment, such as rubbing with, e.g., a gauze or acetate fiber planted cloth.

The insulating films 13a and 13b and alignment control films each comprising an inorganic substance may be formed by vapor deposition, while those each comprising an organic substance may be formed by applying a solution of an organic substance or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The insulating films 13a and 13b and alignment control films 14a and 14b may have a thickness of ordinarily 3–1000 nm, preferably 3–300 nm, further preferably 5–200 nm, respectively.

In case where the liquid crystal device is used as a color liquid crystal display device, at least one glass substrates 11a and 11b is provided with a dotted or lined color filter pattern comprising various color materials of red (R), green (G), blue (B), white (W), etc. (not shown).

The color filter pattern formed on the glass substrate may be coated with a smoothing layer comprising an inorganic or organic material so as to minimize a stepwise difference between lines or dots constituting a color filter. Further, between the lines or dots of the color filter, a black light-interrupting (masking) layer comprising a metal or resin material may preferably be disposed (not shown) in order to prevent color-mixing of the respective colors. In such a color liquid crystal display device, the transparent electrode 11a and 11b may be designed in a prescribed pattern depending on the shape of the color filter pattern.

Between the substrates 11a and 11b is disposed a (chiral smectic) liquid crystal composition 15, and the spacing between the substrates 11a and 11b is set to a value (e.g., 0.1–20 µm, preferably 0.5–3 µm). The small spacing (e.g., 0.5–3 µm) is sufficiently small to suppress the formation of a helical structure of the (chiral smectic) liquid crystal composition 15, thus resulting in bistable alignment states of the liquid crystal composition 15. The small spacing is held by spacer beads 16 composed of, e.g., silica, alumina, polymer film, glass fiber, etc., dispersed between the substrates. Further, it is possible to dispose particles of an adhesive agent between the spacing in order to hold the spacing formed by spacer beads 16.

The periphery of the glass substrates 11a and 11b is sealed up with a sealing agent (not shown) such as an epoxy adhesive.

Further, outside the glass substrates 11a and 11b, a pair of polarizers 17a and 17b are applied to the respective glass substrates.

Incidentally, the crossing angle referred to herein as described above may be defined as follows.

The crossing angle may be determined by an angle, e.g., in the counterclockwise direction formed between a uniaxial alignment axis provided to the upper alignment film 14a and that provided to the lower alignment film 14b on the basis of the former axis. These alignment axes may preferably be directed in the same direction and intersect with each other at a crossing angle of within ±25 degrees, preferably at a crossing angle of above 0 degrees (as absolute value) and at most 25 degrees (as absolute value), particularly 1–25 degrees (as absolute value).

In forming a transmission-type liquid crystal device, the liquid crystal apparatus of the present invention may include a light source (not shown) disposed outside either one of the polarizers 17a and 17b.

The liquid crystal apparatus may include the above-mentioned liquid crystal device, drive means (e.g., drive circuit) and a light source as a backlight. The liquid crystal apparatus may preferably be a liquid crystal display apparatus.

Figure 9:
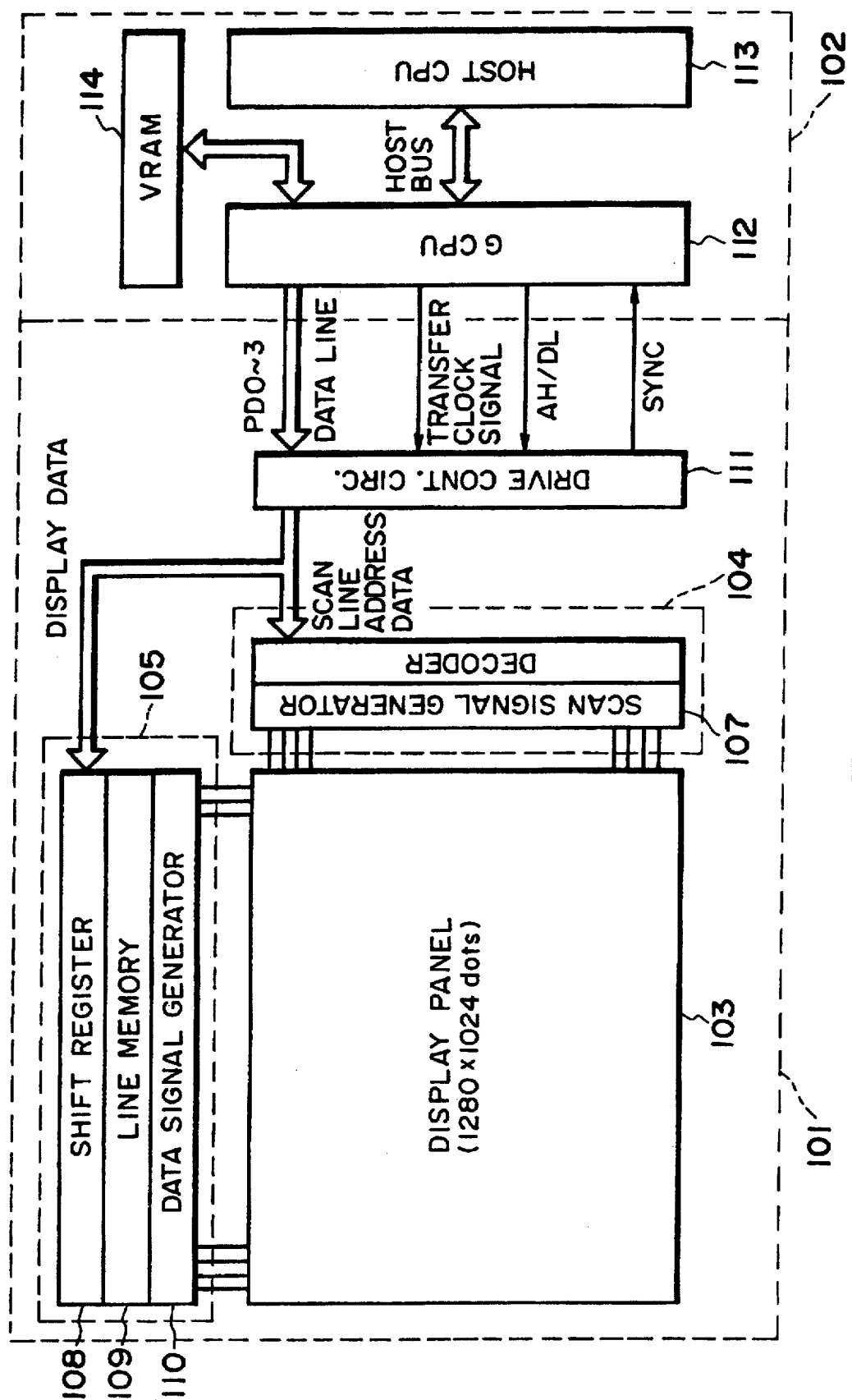
FIG. 9 is a block diagram of a liquid crystal display apparatus and a graphic controller.
Figure 10:
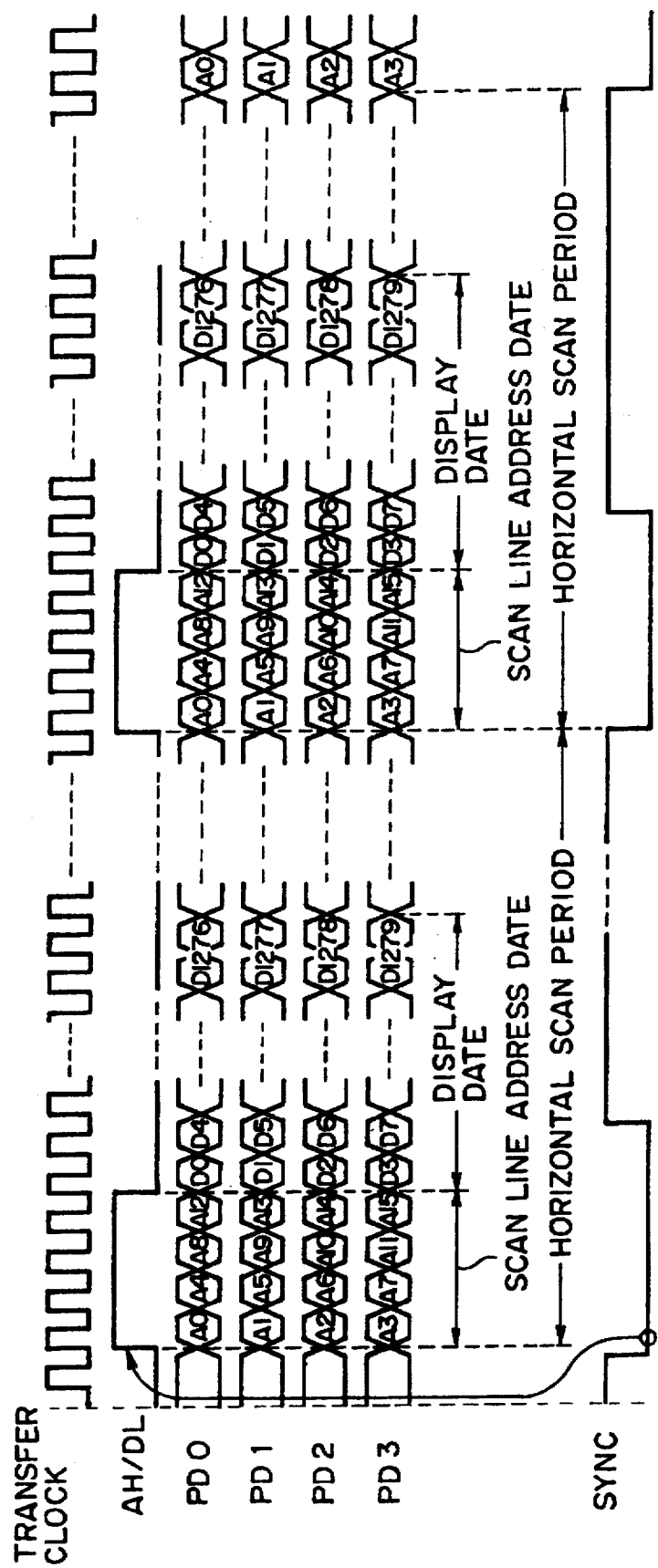
FIG. 10 is a time chart showing time correlation for image data communication between the liquid crystal display apparatus and the graphic controller.
Figure 11:
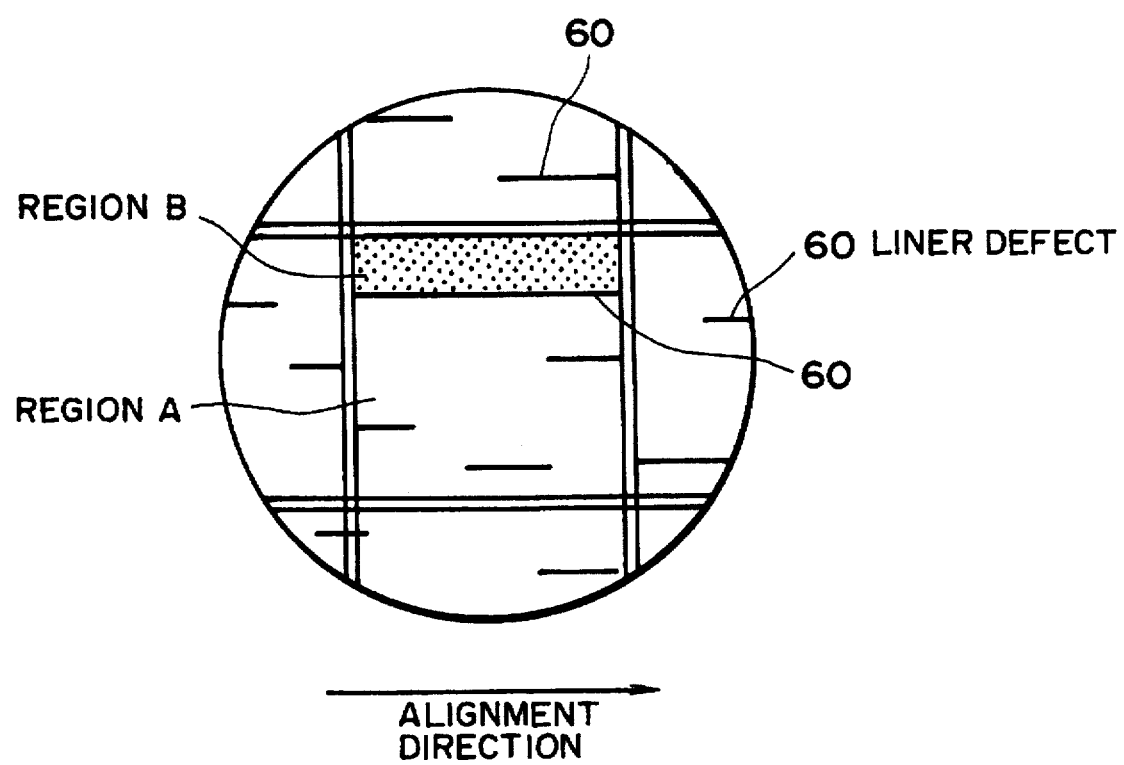
FIG. 11 is a schematic illustration showing an enlarged pixel including a line defect and minute alignment regions different in apparent tilt angle $\theta a$.

The liquid crystal display apparatus may be constituted by using the liquid crystal device for a display panel and by adopting an arrangement and data format comprising image data accompanied with scanning line address data and also a communication synchronization scheme using a SYNC signal as shown in FIGS. 9 and 10.

Referring to FIG. 9, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to the display panel 103 (illuminated with a backlight (not shown)) by signal transfer means shown in FIGS. 9 and 10. The graphic controller 102 principally comprises a CPU (or GCPU, central processing unit) 112 and a VRAM (video-RAM, image data storage memory) 114 and is in charge of management and communication of image data between a host CPU 113 and the liquid crystal display apparatus (FLCD) 101. The control of image display according to the present invention is principally accomplished by the graphic controller 102. Incidentally, a light source is disposed at the back of the display panel 103.

A simple matrix-type display apparatus using a liquid crystal device comprising a (chiral smectic or ferroelectric) liquid crystal composition disposed between a pair of substrates as described above may be driven by driving methods as disclosed by, e.g., JP-A 59-193426, JP-A 59-193427, JP-A 60-156046 and JP-A 60-156047.

Figure 4:
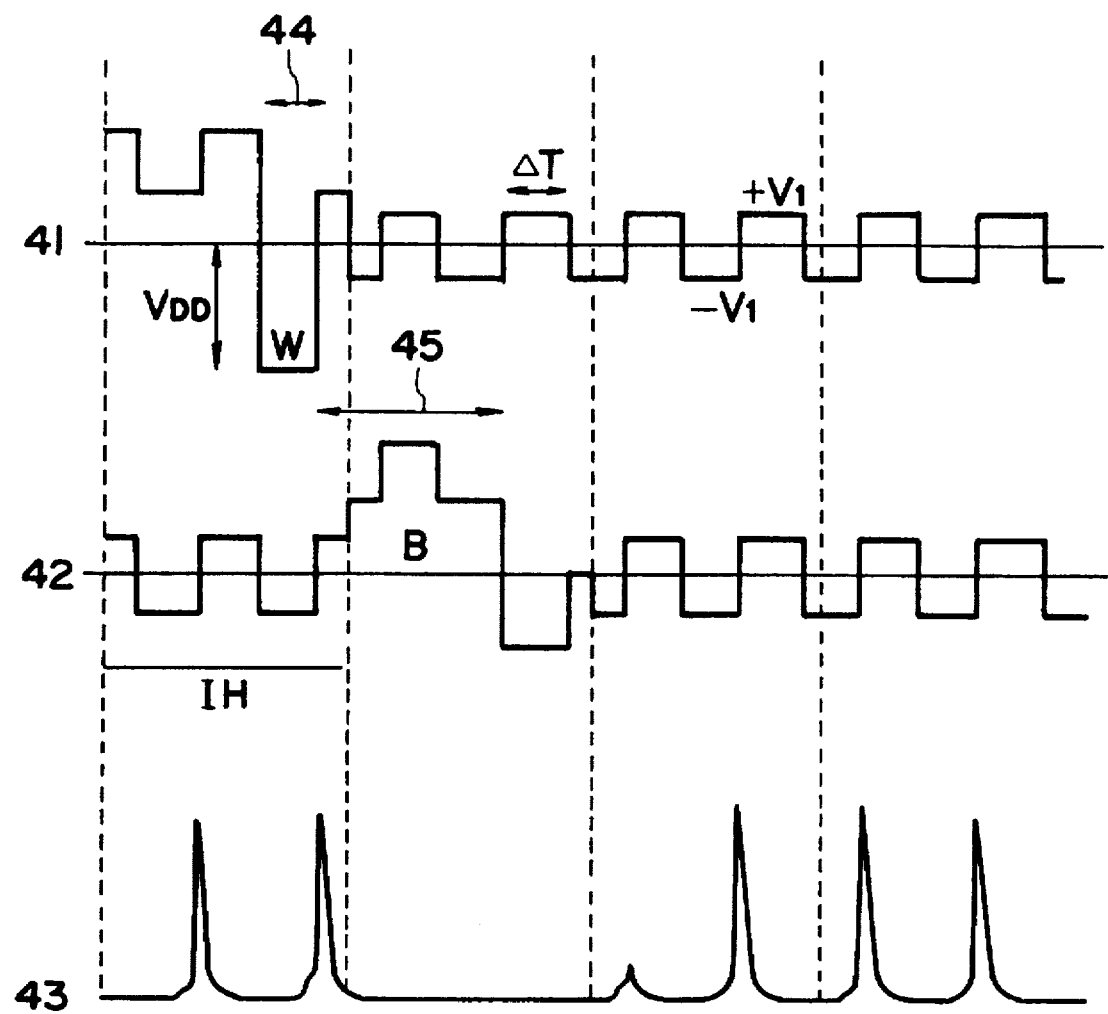
FIG. 4 is a waveform diagram illustrating driving waveforms and an optical response waveform in an embodiment of the present invention.

FIG. 4 is a waveform diagram showing an example set of driving waveforms used in such a driving method.

More specifically, FIG. 4 shows an embodiment of a set of drive waveforms and an optical response waveform, wherein a waveform 41 represents a voltage waveform for displaying a "white" state, a waveform 42 represents a voltage waveform for displaying a "black" state, and a waveform 43 represents an optical response waveform under application of the waveform 42. Referring to FIG. 4, in these waveforms 41 and 42, an electric field required to display "white" or "black" on each matrix or pixel at each intersection of scanning electrodes and data electrodes is applied in a selection period 44 or 45, respectively. In other periods (non-selection periods), weak positive and negative pulse electric fields not causing re-writing of "white" or "black" are alternately applied for a long period of time which by far exceeds the selection period (44 or 45) of time.

Figure 5:
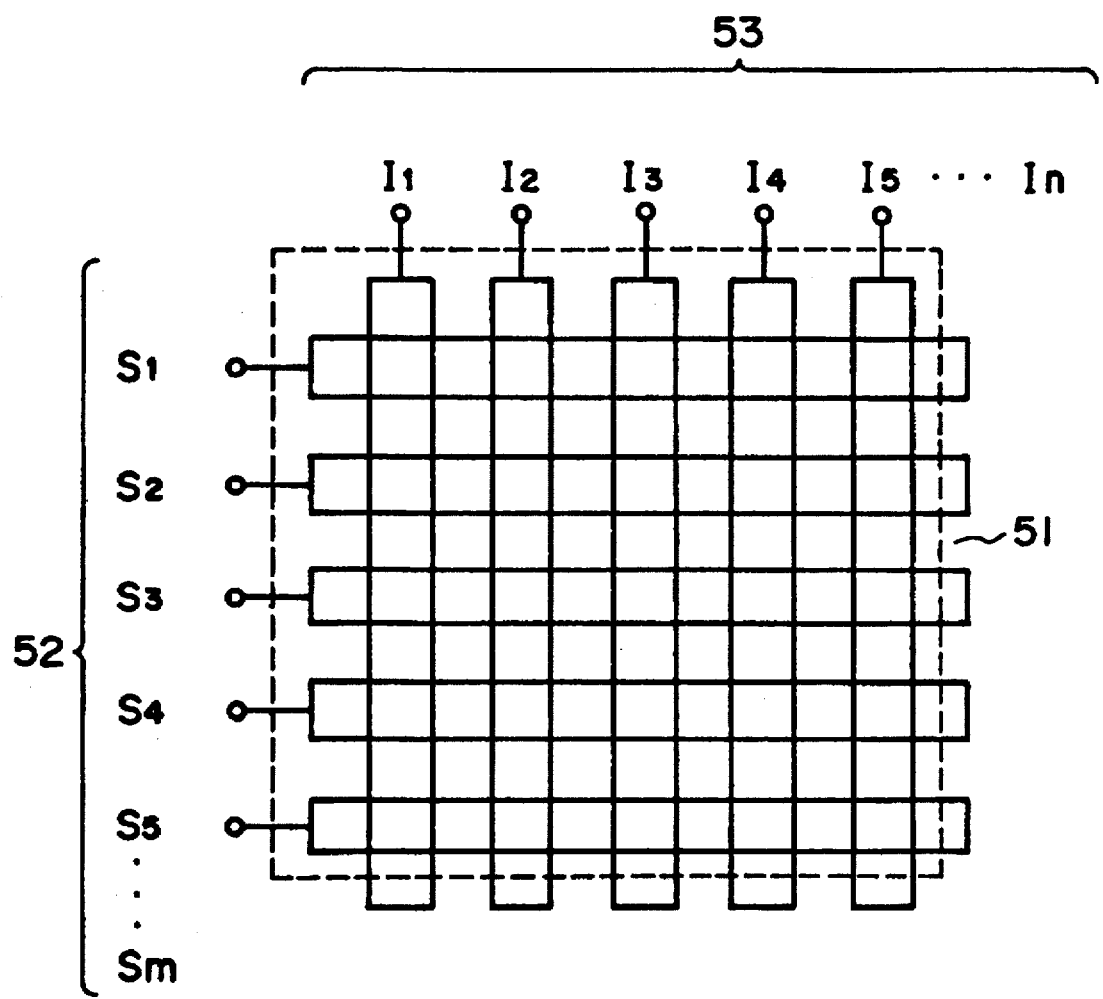
FIG. 5 is a plan view of an electrode matrix.
Figure 6A:
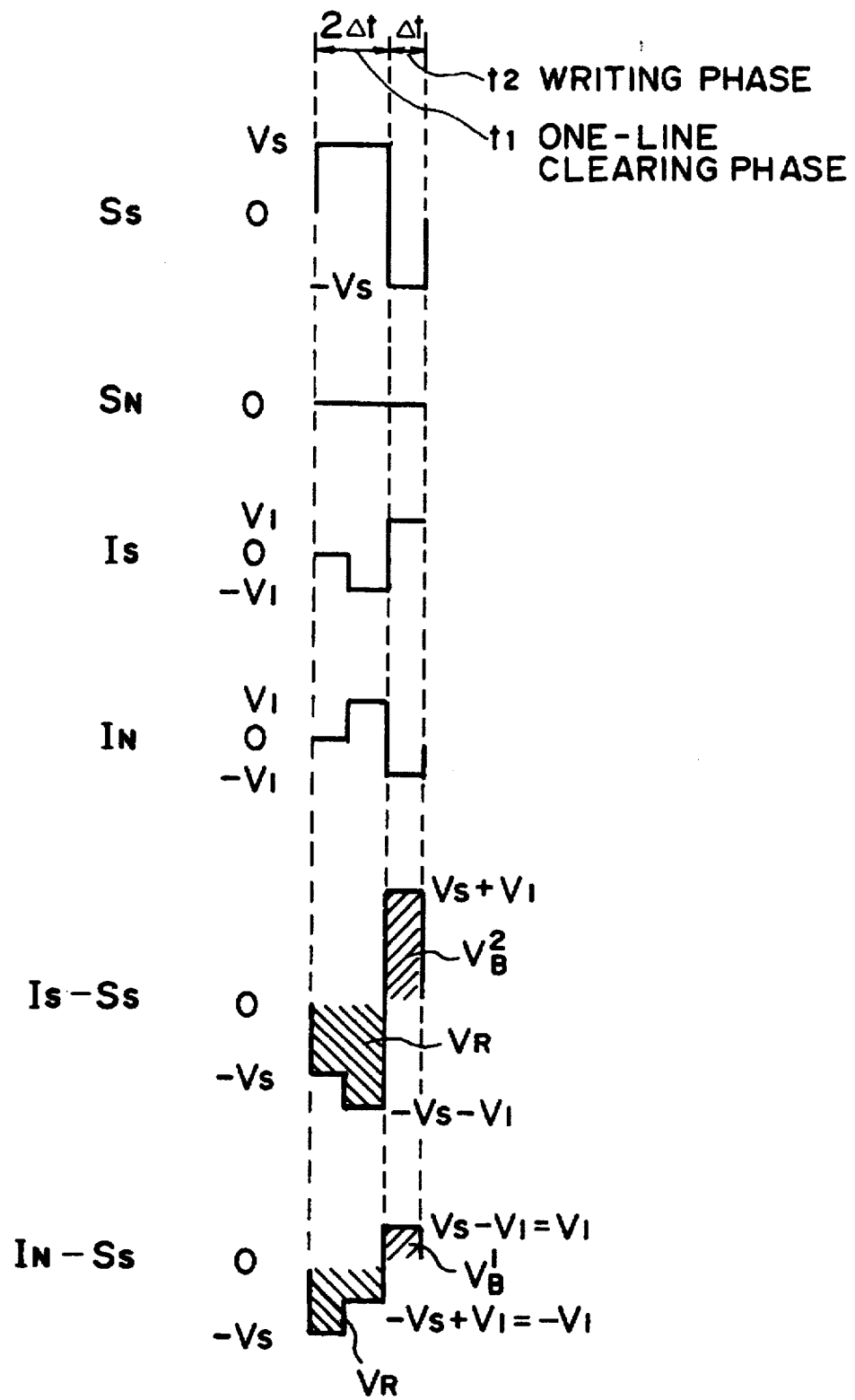
FIG. 6A shows an embodiment of unit driving waveforms and FIG. 6B is time-serial waveforms comprising a succession of such unit waveforms.
Figure 6B:
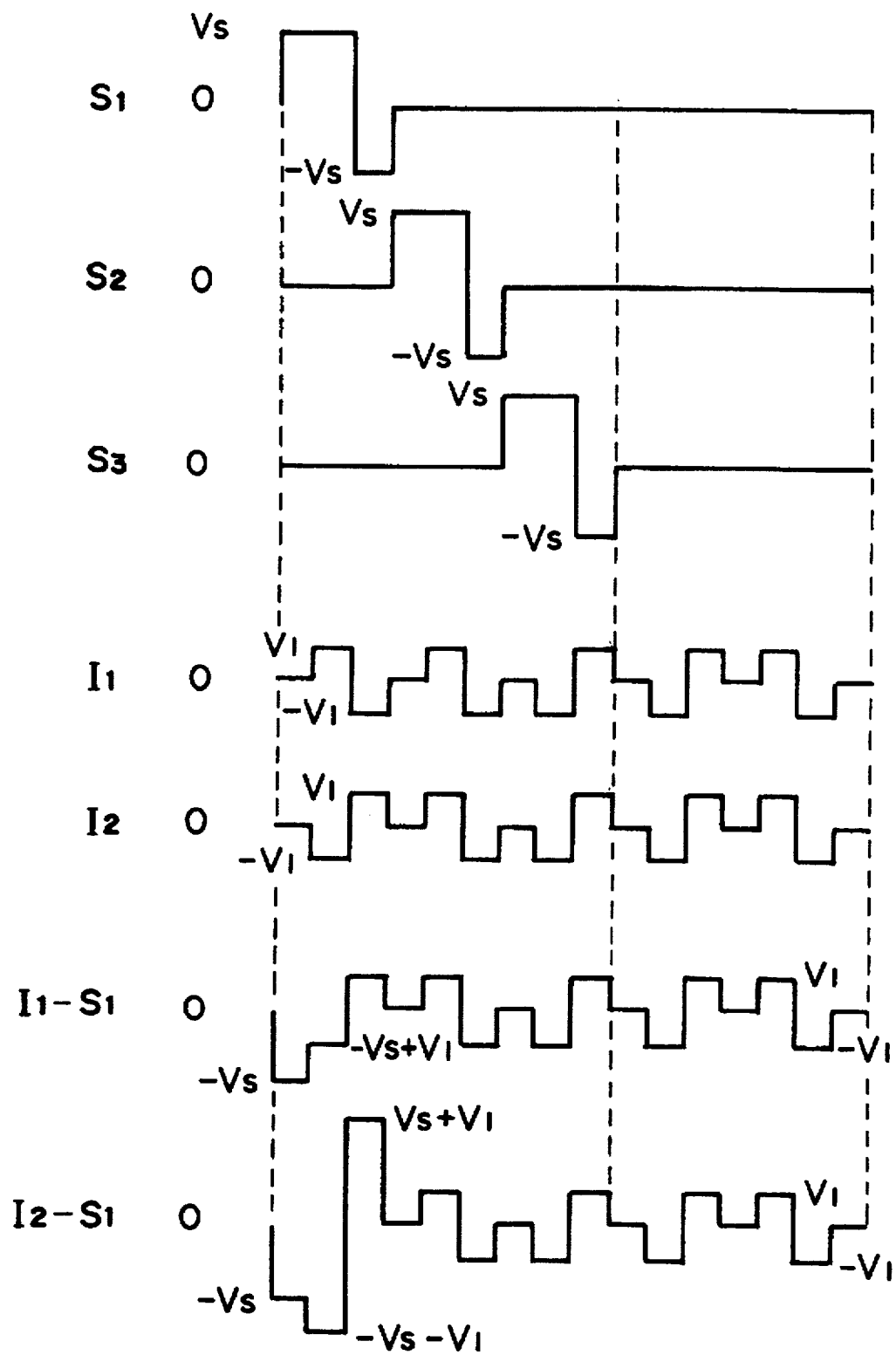
Figure 7:
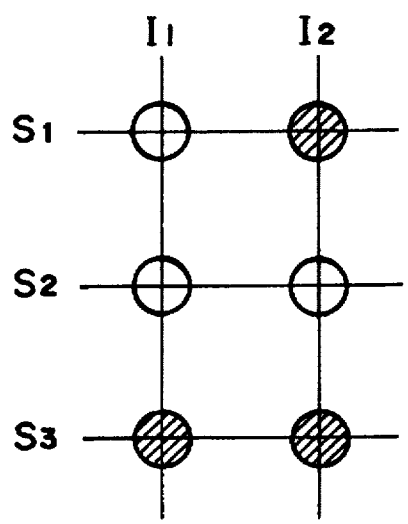
FIG. 7 is an illustration of a display pattern obtained by an actual drive using the time-serial waveforms shown in FIG. 6B.
Figure 8:
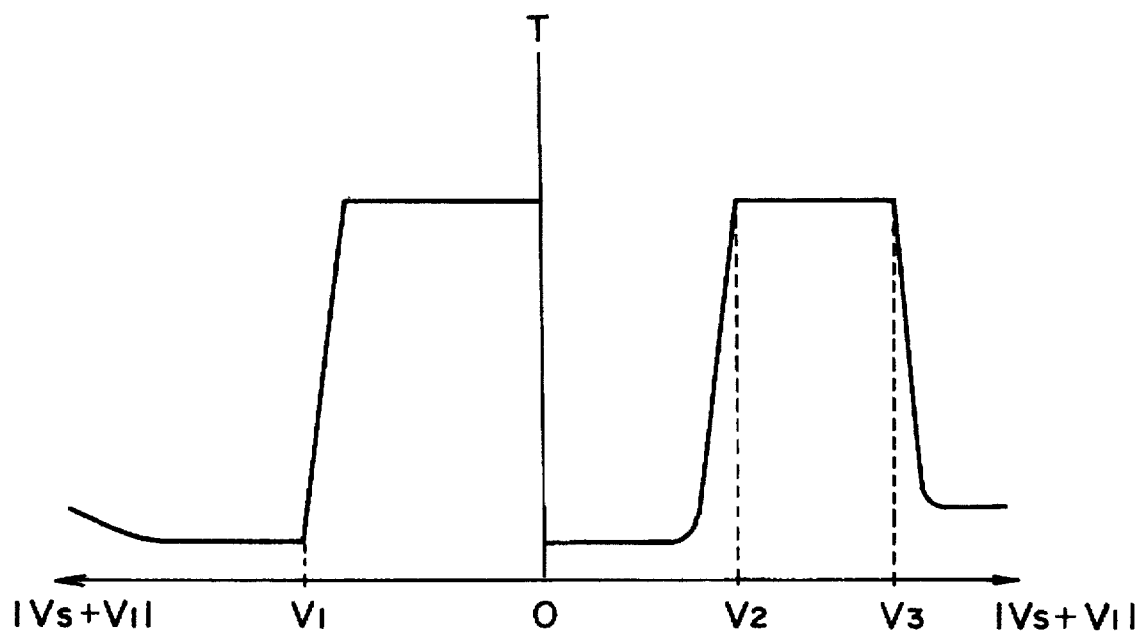
FIG. 8 is a V–T characteristic chart showing a change in transmittance under application of different drive voltages.

FIG. 5 is a plan view showing an electrode matrix used in a chiral smectic liquid crystal panel 51 of a simple matrix-type. The liquid crystal panel 51 shown in FIG. 5 includes scanning electrodes 52 and data electrodes 53 intersecting each other so as to constitute a pixel at each intersection together with a chiral smectic liquid crystal disposed between the scanning electrodes 52 and data electrodes 53.

The values of cone angle Ⓗ, apparent tilt angle θa, layer inclination angle δ in smectic layer, pretilt angle α and spontaneous polarization Ps referred to herein are based on values measured according to the following methods.

Measurement of cone angle Ⓗ

A liquid crystal device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K.K.) to find a first extinct position (a position providing the lowest transmittance) and a second extinct position. A cone angle (H) was measured as a half of the angle between the first and second extinct positions.

Measurement of apparent tilt angle θa

A liquid crystal device sandwiched between right angle cross nicol polarizes was supplied with a single pulse of one polarity exceeding the threshold voltage of the ferroelectric liquid crystal and was then rotated under no electric field horizontally relative to the polarizers to find a first extinction position. Then, the liquid crystal device was supplied with a single pulse of the opposite polarity exceeding the threshold voltage of the ferroelectric liquid crystal and was then rotated under no electric field relative to the polarizers to find a second extinct position. An apparent tilt angle θa was measured as a half of the angle between the first and second extinct positions.

Measurement of liquid crystal layer inclination angle δ

The method used was basically similar to the method used by Clark and Largerwal (Japanese Display '86, Sept. 30–Oct. 2, 1986, p.p. 456–458) or the method of Ohuchi et al (J.J.A.P., 27 (5) (1988), p.p. 725–728). The measurement was performed by using a rotary cathode-type X-ray diffraction apparatus (available from MAC Science), and 80 µm-thick microsheets (available from Corning Glass Works) were used as the substrates so as to minimize the X-ray absorption with the glass substrates of the liquid crystal cells.

Measurement of pretilt angle α

The measurement was performed according to the crystal rotation method as described at Jpn. J. Appl. Phys. vol. 19 (1980), No. 10, Short Notes 2013.

More specifically, a cell was filled with a standard liquid crystal mixture for measurement assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

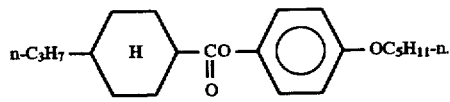

For measurement, the liquid crystal cell provided with an objective alignment control layer was rotated in a plane perpendicular to the pair of substrates and including the aligning treatment axis (rubbing axis) and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

A pretilt angle α was obtained through a simulation wherein a fitting of a spectrum of the intensity of the transmitted light formed by interference was effected with respect to the following theoretical curve (a) and relationship (b):

$$T(\phi) = \cos^2\left[\frac{\pi d}{\lambda}\left(\frac{NeNo\sqrt{N^2(\alpha) - \sin^2\phi}}{N^2(\alpha)} - \sqrt{No^2 - \sin^2\phi} - \frac{Ne^2 - No^2}{N^2(\alpha)}\sin\alpha \cdot \cos\alpha \cdot \sin\phi\right)\right], \quad (a)$$

and $$N(\alpha) \equiv \sqrt{No^2 \cdot \cos^2\alpha + Ne^2 \cdot \sin^2\alpha}, \quad (b)$$

wherein No denotes the refractive index of ordinary ray, Ne denotes the refractive index of extraordinary ray, φ denotes the rotation angle of the cell, T(φ) denotes the intensity of the transmitted light, d denotes the cell thickness, and λ denotes the wavelength of the incident light.

Measurement of spontaneous polarization Ps

The spontaneous polarization Ps was measured according to "Direct Method with Triangular Waves for Measuring Spontaneous Polarization in Ferroelectric Liquid Crystal", as described by K. Miyasato et al (Japanese J. Appl. Phys. 22, No. 10, L661 (1983)).

Hereinbelow, the present invention will be described more specifically based on Examples to which the present invention is not intended to be limited, however.

EXPERIMENTAL EXAMPLE 1

A (base) liquid crystal composition 1 (Composition 1) was prepared by mixing the following compounds in the indicated proportions.

| Structural formula | wt. parts |
|---|---|
| C₅H₁₁–⌬–N=N–⌬–C₅H₁₁ (with S) | 6.3 |
| C₆H₁₃–⌬–N=N–⌬–C₄H₉ (with S) | 6.2 |
| C₁₁H₂₃–[N-pyr]–⌬–OC(=O)–[S-thio]–C₄H₉ | 8.3 |
| C₁₁H₂₃–[N-pyr]–⌬(F)–OC(=O)–[S-thio]–C₄H₉ | 4.2 |
| C₆H₁₃–[benzothiazole]–⌬–OC₈H₁₇ | 25.0 |
| C₆H₁₃–[N-pyr]–⌬–OC₁₂H₂₅ | 5.0 |
| C₈H₁₇–[N-pyr]–⌬–OC₉H₁₉ | 10.0 |

-continued

| Structure | Value |
|---|---|
| $C_8H_{17}$—(pyrimidine)—(phenyl)—$OC_{10}H_{21}$ | 10.0 |
| $C_9H_{19}$—(pyrimidine)—(phenyl)—$OC_8H_{17}$ | 5.0 |
| $C_{10}H_{21}$—(pyrimidine)—(phenyl-F)—$OCH_2\overset{*}{C}HC_6H_{13}$ | 12.5 |
| $C_{10}H_{21}O$—(phenyl)—CO—O—(phenyl)—$OCH_2\overset{CH_3}{\underset{}{C}H}C_2H_5$ | 7.5 |

The liquid crystal composition 1 was further mixed with the following mesomorphic compounds in the indicated proportions to prepare a liquid crystal compositions 1S, 1A and 1B, respectively.

| Composition or Ex.Comp.No. | wt. % |
|---|---|
| Composition 1 | 88 |
| <Composition 1S> | |
| A-3 | 3 |
| A-11 | 3 |
| A-13 | 1 |
| B-3 | 5 |
| <Composition 1A> | |
| A-3 | 5 |
| A-11 | 5 |
| A-13 | 2 |
| <Composition 1B> | |
| B-3 | 12 |

The liquid crystal compositions 1, 1S, 1A and 1B showed phase transition series and various properties at 30° C. including a magnitude of spontaneous polarization Ps (nC/cm$^2$), a cone angle Ⓗ (degrees), and a layer inclination angle (degrees) summarized in Table 1 appearing hereinbelow.

Then, a liquid crystal device having a picture area (size of about 280 mm (data line side) × about 220 mm (scanning line side); the number of pixels of 1280 (data line side)× 1024 (scanning line side)) was prepared in the following manner.

Two 1.1 mm-thick glass plates were provided as a pair of substrates and were respectively coated with transparent ITO electrodes each having a side metal wire of molybdenum, followed by coating with a 150 nm-thick tantalum oxide as a transparent dielectric film by sputtering.

A solution in NMP of a polyimide precursor ("LQ 1802" mfd. by Hitachi Kasei K.K.) was applied onto the tantalum oxide film by spinner coating to form a 25 nm-thick polyimide alignment film (after drying). The resultant film was then rubbed with acetate fiber planted cloth. Then, on one of the substrates, epoxy resin adhesive particles having an average particle size of 5.5 µm ("Torepearl" (trade name), available from Toray K.K.) were dispersed at a density of 50 particles/mm$^2$ by the Nord Son electrostatic dispersion method and, on the other substrate, silica micro-beads having an average particle size of 1.2 µm were dispersed at a density of 300 particles/mm$^2$ by the Nord Son electrostatic dispersion method. Then, a liquid adhesive ("Struct Bond" (trade name), mfd. by Mitsui Toatsu Kagaku K.K.) as a sealing member was applied by printing in a thickness of 6 µm. Then, the two glass plates were applied to each other so that their rubbed directions extended generally in the same direction but intersected each other at a crossing angle of 8 (degrees), and bonded to each other by applying a pressure of 2.8 kg/cm$^2$ at 70° C. for 5 min, followed by further curing of the two types of adhesives under a pressure of 0.63 kg/cm$^3$ at 150° C. for 4 hours to form a blank cell.

Then, blank cells prepared in the above described manner were respectively evacuated to a reduced pressure of about 10 Pa. Thereafter, liquid crystal compositions 1, 1S, 1A and 1B, were respectively, injected into the respective blank cells in isotropic liquid phase or cholesteric phase and were cooled to 30° C. through phase transition of cholesteric phase, smectic A phase, and chiral smectic C phase on temperature decrease, respectively, thus preparing respective ferroelectric (chiral smectic) liquid crystal devices.

Each of the thus prepared liquid crystal devices was subjected to observation of an alignment characteristic within a cell at 5° C. and 30° C.

The liquid crystal device was driven by applying the set of driving waveforms shown in FIG. 4 (1/3.3 bias ratio) to measure a driving voltage margin $\Delta V$ ($V_3-V_1$) at 5° C. and 3° C. while setting $\Delta t$ so as to provide $V_1=15$ volts. Further, the liquid crystal device was subjected to observation of a degree of line defect and a driving characteristic and also subjected to measurement of deviation angle (of molecular axes giving the darkest state) and a contrast (contrast ratio) (C/R) at the time of drive.

The contrast (C/R) was measured in the following manner.

At 30° C., the entire liquid crystal device (size of about 280 mm×about 220 mm; 1280×1024 pixels) was divided into 100 (10×10) regions. All the regions were subjected to measurement of a minimum contrast (C/Rmin), a maximum contrast (C/Rmax) and a difference between C/Rmin and C/Rmax (C/R$_{difference}$) based on a transmitted light quantity by using a photomultiplier (available from Hamamatsu Photonics K.K.). More specifically, the liquid crystal device was sandwiched between right angle-cross nicol polarizer and arranged in one of the extinct positions (providing the lowest transmittance) under no electric field application while retaining a certain light quantity from a light source. In such a state, a transmitted light quantity (transmittance) through the liquid crystal device was measured by the photomultiplier. In this instance, a display of "white" and "black" states was performed by using drive waveforms shown in FIG. 4 under the following conditions:

voltage (scanning line side)=±11.2 V (partially ±4.8 V),
voltage (data line side)=±4.8 V,
Vop=16.0 V, and
$\Delta T$ (set to provide $V_1=15.0$ V).

The results are summarized in Table 2 appearing hereinafter together with a crossing angle, a pretilt angle α and an apparent tilt angle θa with respect to the respective liquid crystal devices.

Herein, evaluation of respective characteristics.
Parameter of Driving Voltage Margin ("ΔV Parameter")

The parameter of the driving voltage margin $\Delta V$ ($=V_3-V_1$) was determined based on an equation: ($V_3-V_1$)/($V_3+V_1$). The larger value allows a more latitude in image-displaying ability against a change in drive voltage. Generally, a ΔV Parameter of at least 0.1 allows a practically acceptable display level.

Alignment Characteristic ("Alignment")

The alignment characteristic is evaluated a an alignment state of liquid crystal molecules at the time of initial alignment stage where the liquid crystal device is not driven.

C1U: The entire region showed C1 uniform alignment.

C1T: C1 twist (splay) alignment region appeared.

C2: C2 alignment region appeared.

Driving Characteristic ("Driving")

The driving characteristic is evaluated as a switching state or alignment state of liquid crystal molecules at the time of the drive of the liquid crystal device.

C1U: Switching was observed only between regions in C1 uniform alignment.

C1T: C1 twist (splay) alignment region appeared.

C2: C2 alignment region appeared.

In the above evaluation of "Alignment" and "Driving", C1U, C1T and C2 represent the following states, respectively.

"C2" means that a region surrounded by a lightning defect and a hairpin defect in a direction parallel to the average rubbing direction in a cell appears.

"C1U" means that, under cross nicols, the entire display area of a cell shows a complete black state in an extinction position (i.e., light transmittance=0%) at the time of initial alignment stage ("Alignment") or during the drive of the device ("Driving")

"C1T" means that a region failing to provide a complete black state in an extinction position (i.e., light transmittance of above 0%) is present in a display area of a cell.

EXPERIMENTAL EXAMPLE 2

A liquid crystal composition 2 was prepared by mixing the following compounds in the indicated proportions.

| Structural formula | wt. % |
|---|---|
| 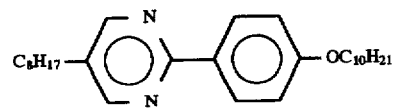 | 8 |
| 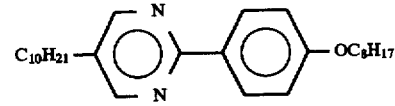 | 9 |
| 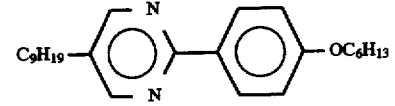 | 6 |
| 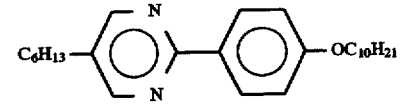 | 5 |
| 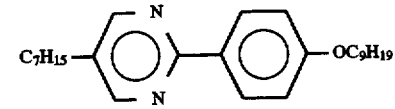 | 3 |

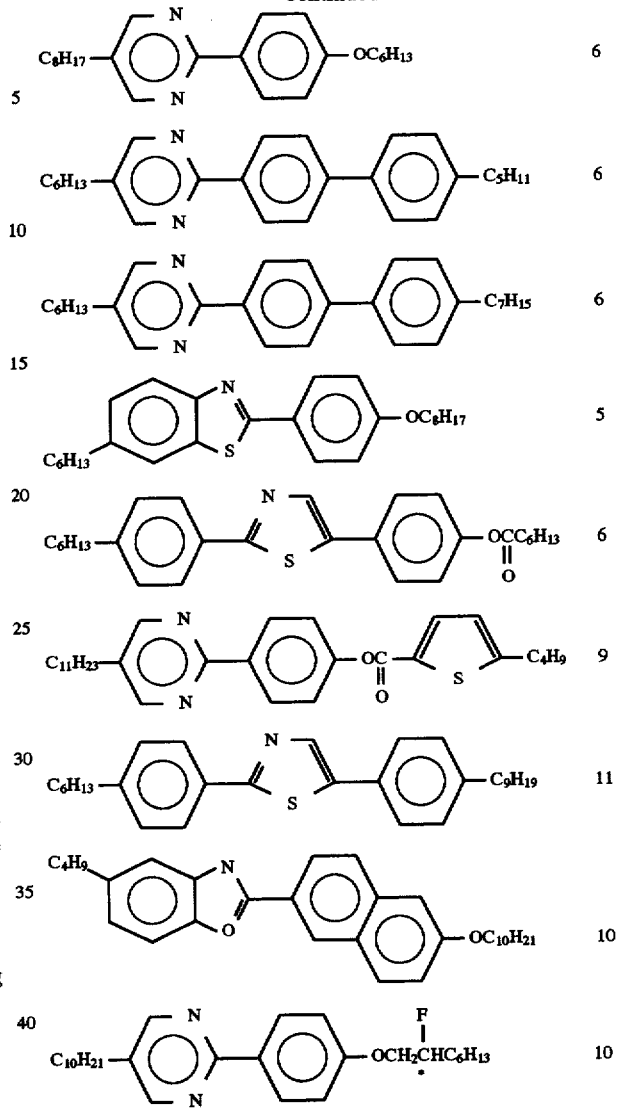

The liquid crystal composition 2 was further mixed with the following mesomorphic compounds in the indicated proportions to prepare a liquid crystal compositions 2S, 2A and 2B, respectively.

| Composition or Ex.Comp.No. | wt. % |
|---|---|
| Composition 2 | 91 |
| <Composition 2S> | |
| A-4 | 4 |
| A-22 | 1 |
| B-14 | 2 |
| B-21 | 2 |
| <Composition 2A> | |
| A-4 | 6 |
| A-22 | 3 |
| <Composition 2B> | |
| B-14 | 4 |
| B-21 | 5 |

Liquid crystal devices were prepared and evaluated in the same manner as in Experimental Example 1 except for using the above-prepared liquid crystal compositions 2, 2S, 2A and 2B, respectively.

The results of this experimental example are summarized in Tables 1 and 2 appearing hereinafter.

EXPERIMENTAL EXAMPLE 3

A liquid crystal composition 3 was prepared by mixing the following compounds in the indicated proportions.

| Structural formula | wt. % |
|---|---|
| 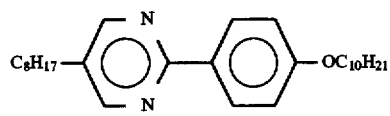 | 8 |
| 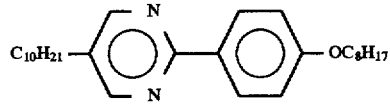 | 9 |
| 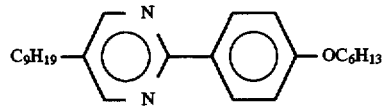 | 6 |
| 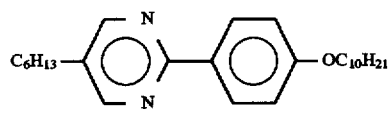 | 6 |
| 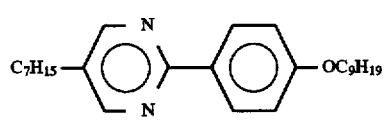 | 2 |
| 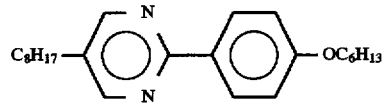 | 6 |
| 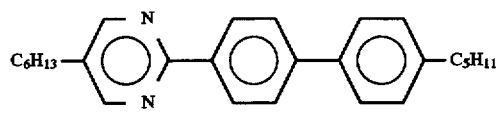 | 7 |
| 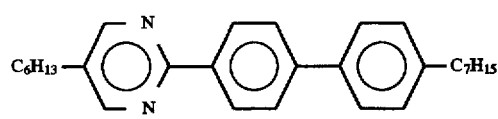 | 7 |
| 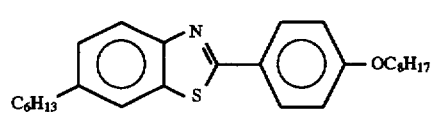 | 2 |
| 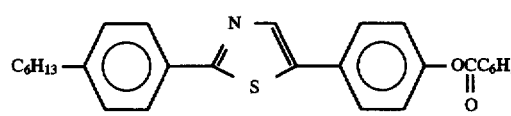 | 4 |
| 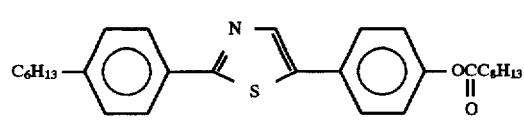 | 5 |
| 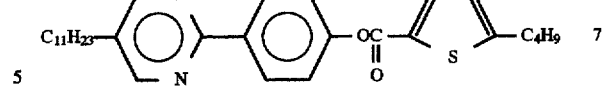 | 7 |
| 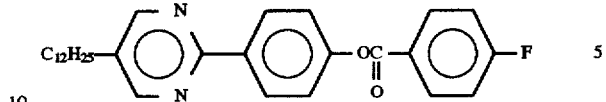 | 5 |
| 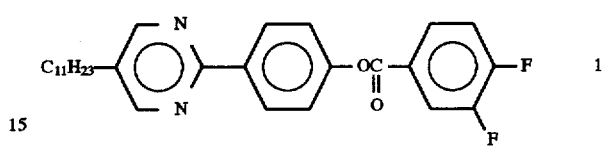 | 1 |
| 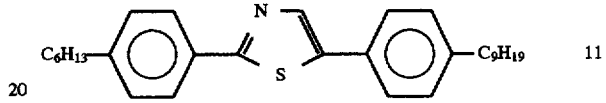 | 11 |
| 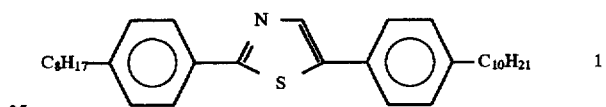 | 1 |
| 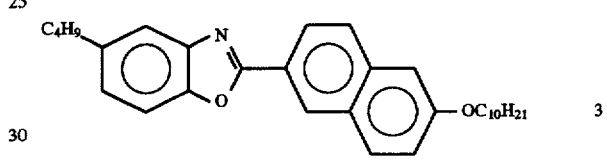 | 3 |
| 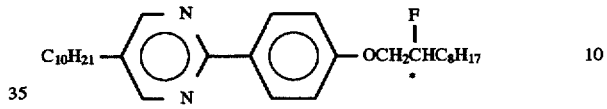 | 10 |

The liquid crystal composition 3 was further mixed with the following mesomorphic compounds in the indicated proportions to prepare a liquid crystal compositions 3S, 3A and 3B, respectively.

| Composition or Ex.Comp.No. | wt. % |
|---|---|
| Composition 3 | 87 |
| <Composition 3S> | |
| A-14 | 4 |
| A-15 | 3 |
| A-25 | 1 |
| B-3 | 3 |
| B-14 | 2 |
| <Composition 3A> | |
| A-14 | 6 |
| A-15 | 5 |
| A-25 | 2 |
| <Composition 3B> | |
| B-3 | 7 |
| B-14 | 6 |

Liquid crystal devices were prepared and evaluated in the same manner as in Experimental Example 1 except for using the above-prepared liquid crystal compositions 3, 3S, 3A and 3B, respectively.

The results of this experimental example are summarized in Tables 1 and 2 appearing hereinafter.

EXPERIMENTAL EXAMPLE 4

A liquid crystal composition 4S was prepared by mixing the following compounds with Composition 3 prepared in Experimental Example 3 in the indicated proportions.

| Composition or Ex.Comp.No. | wt. % |
|---|---|
| Composition 3 | 90 |
| A-5 | 5 |
| A-12 | 2 |
| B-4 | 2 |
| B-17 | 1 |

A liquid crystal device was prepared and evaluated in the same manner as in Experimental Example 1 except for using the liquid crystal composition 4S.

The results of this experimental example are summarized in Tables 1 and 2 appearing hereinafter.

EXPERIMENTAL EXAMPLE 5

A liquid crystal composition 5S was prepared by mixing the following compounds with Composition 3 prepared in Experimental Example 3 in the indicated proportions.

| Composition or Ex.Comp.No. | wt. % |
|---|---|
| Composition 3 | 87 |
| A-4 | 4 |
| A-16 | 3 |
| A-19 | 1 |
| B-10 | 3 |
| B-28 | 2 |

A liquid crystal device was prepared and evaluated in the same manner as in Experimental Example 1 except for using the liquid crystal composition 5S.

The results of this experimental example are summarized in Tables 1 and 2 appearing hereinafter.

EXPERIMENTAL EXAMPLE 6

A liquid crystal composition 6S was prepared by mixing the following compounds with Composition 3 prepared in Experimental Example 3 in the indicated proportions.

| Composition or Ex.Comp.No. | wt. % |
|---|---|
| Composition 3 | 84 |
| A-7 | 5 |
| A-11 | 5 |
| A-23 | 2 |
| B-5 | 2 |
| B-16 | 2 |

A liquid crystal device was prepared and evaluated in the same manner as in Experimental Example 1 except for using the liquid crystal composition 6S.

The results of this experimental example are summarized in Tables 1 and 2 shown below.

TABLE 1

| Ex. No. | Composition | Phase transition temp. (°C.) Cry ← SmC* ← SmA ← Ch ← Iso | | | | at 30° C. Ps (nC/cm$^2$) | Θ (deg.) | δ (deg.) |
|---|---|---|---|---|---|---|---|---|
| 1 | 1 | <−10 | 65.7 | 75.0 | 83.5 | 12.6 | 21.2 | 14.1 |
|   | 1S | <−10 | 66.3 | 78.4 | 85.5 | 12.4 | 21.3 | 13.9 |
|   | 1A | <−10 | 63.9 | 77.2 | 83.6 | 11.6 | 19.5 | 12.8 |
|   | 1B | <−10 | 69.4 | 79.1 | 87.4 | 12.9 | 23.3 | 14.8 |
| 2 | 2 | <−10 | 66.3 | 85.6 | 92.4 | 5.8 | 14.9 | 10.0 |
|   | 2S | <−10 | 68.1 | 87.5 | 94.3 | 6.3 | 15.9 | 10.8 |
|   | 2A | <−10 | 65.1 | 86.8 | 92.9 | 5.6 | 14.3 | 9.6 |
|   | 2B | <−10 | 71.3 | 89.2 | 96.2 | 7.9 | 17.9 | 11.8 |
| 3 | 3 | <−10 | 66.4 | 89.2 | 96.1 | 6.3 | 14.8 | 10.2 |
|   | 3S | <−10 | 69.0 | 92.3 | 98.5 | 6.4 | 15.3 | 10.5 |
|   | 3A | <−10 | 64.2 | 91.2 | 97.2 | 5.9 | 13.6 | 9.7 |
|   | 3B | <−10 | 73.5 | 93.6 | 100.7 | 8.1 | 18.9 | 12.9 |
| 4 | 4S | <−10 | 67.2 | 91.4 | 97.7 | 6.2 | 14.8 | 10.2 |
| 5 | 5S | <−10 | 66.0 | 91.6 | 98.3 | 6.4 | 15.3 | 10.5 |
| 6 | 6S | <−10 | 67.8 | 91.8 | 97.4 | 6.2 | 15.0 | 10.3 |

In Table 1, the respective symbols in the phase transition series represent the following phases:
Cryst.: crystal phase or higher order-smectic phase,
Sm*C: chiral smectic C phase,
SmA: smectic A phase,
Ch: cholesteric phase (chiral nematic phase), and
Iso: isotropic liquid phase.

TABLE 2

| Ex. No. | Compo- sition | Cell Crossing angle (deg.) | α (deg.) | at 5° C. Alignment | at 5° C. Driving | at 5° C. ΔV parameter | at 30° C. Alignment | at 30° C. Driving | at 30° C. ΔV parameter | at 30° C. Deviation Θa (deg.) | at 30° C. angle (deg.) | C/R min | C/R max | C/R difference |
|---|---|---|---|---|---|---|---|---|---|---|---|---|---|---|
| 1 | 1  | 8 | 24 | C1T | C1T | 0.0   | C1T | C1T | 0.053 | 13.8 | 1.2 | 15 | 25 | 10 |
|   | 1S |   |    | C1U | C1U | 0.151 | C1U | C1U | 0.223 | 14.0 | 0.6 | 17 | 23 | 6  |
|   | 1A |   |    | C1T | C1T | 0.0   | C1U | C1U | 0.181 | 12.8 | 0.9 | 13 | 21 | 8  |
|   | 1B |   |    | C1U | C1U | 0.148 | C1T | C1T | 0.096 | 15.2 | 1.9 | 12 | 24 | 12 |
| 2 | 2  | 8 | 17 | C2  | C2  | 0.0   | C1U | C1U | 0.160 | 11.4 | 1.4 | 15 | 25 | 10 |
|   | 2S |   |    | C1U | C1U | 0.163 | C1U | C1U | 0.209 | 12.0 | 0.6 | 18 | 24 | 6  |
|   | 2A |   |    | C2  | C2  | 0.0   | C1U | C1U | 0.179 | 10.9 | 0.8 | 12 | 20 | 8  |
|   | 2B |   |    | C1U | C1U | 0.144 | C1T | C1T | 0.118 | 13.4 | 2.1 | 9  | 21 | 12 |
| 3 | 3  | 8 | 18 | C2  | C2  | 0.0   | C1U | C1U | 0.190 | 11.7 | 1.8 | 15 | 25 | 10 |
|   | 3S |   |    | C1U | C1U | 0.181 | C1U | C1U | 0.203 | 11.6 | 0.5 | 18 | 23 | 5  |
|   | 3A |   |    | C2  | C2  | 0.0   | C1U | C1U | 0.179 | 10.2 | 0.7 | 12 | 20 | 8  |
|   | 3B |   |    | C1U | C1U | 0.160 | C1U | C1U | 0.169 | 14.2 | 2.4 | 10 | 23 | 13 |
| 4 | 4S | 8 | 16 | C1U | C1U | 0.148 | C1U | C1U | 0.201 | 11.3 | 0.6 | 19 | 24 | 5  |
| 5 | 5S | 8 | 18 | C1U | C1U | 0.163 | C1U | C1U | 0.223 | 11.7 | 0.7 | 17 | 23 | 6  |
| 6 | 6S | 8 | 17 | C1U | C1U | 0.149 | C1U | C1U | 0.196 | 11.5 | 0.6 | 20 | 25 | 5  |

As apparent from Table, the liquid crystal compositions 1S–6S each containing the mesomorphic compounds of the formulae (A) and (B) according to the present invention provide better performances (i.e., C1 uniform alignment state, a good V parameter, a low deviation angle, a high and stable contrast ratio, etc.) at 5° C. and 30° C. (particularly at 5° C.) when compared with the liquid crystal compositions containing the mesomorphic compound of the formula (A) (i.e., Compositions 1A–3A) and the liquid crystal compositions containing the mesomorphic compound of the formula (B) (i.e., Compositions 1B–3B).

As described above, according to the present invention, it is possible to provide a liquid crystal composition not including a region in a C2 alignment state in a low temperature range (e.g., at 5° C.) during a matrix drive to suppress a decrease in drive voltage margin and capable of providing a deviation angle of at most 1 degree to show a good monodomain characteristic and uniformity of molecular axis giving the darkest state, thus minimizing an irregularity in contrast within the entire display area even when a magnitude of a layer inclination angle δ is controlled not to monotonously increase on a low temperature side by incorporating mesomorphic compounds of the formulae (A) and (B) in combination into a resultant liquid crystal composition.

The liquid crystal composition is useful in providing a liquid crystal device and a liquid crystal apparatus with good display and drive characteristics in combination with a drive circuit, a light source, etc.

What is claimed is:

1. A liquid crystal composition, comprising:

a mesomorphic compound represented by the following formula (A):

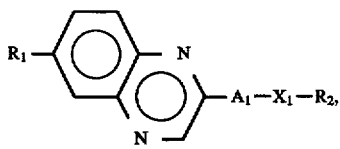

(A)

wherein $R_1$ and $R_2$ independently denote a linear or branched alkyl group having 1–18 carbon atoms; $X_1$ denotes a single bond, —O—, —CO—O— or —O—CO—; and $A_1$ denotes

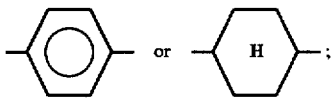

and a mesomorphic compound represented by the following formula (B):

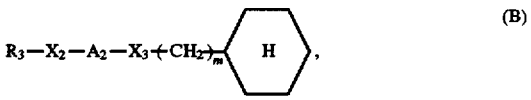

(B)

wherein $R_3$ denotes a linear or branched alkyl group having 1–18 carbon atoms; $X_2$ and $X_3$ independently denote a single bond, —O—, —CO—O— or —O—CO—; m is an integer of 3–16; and $A_2$ denotes

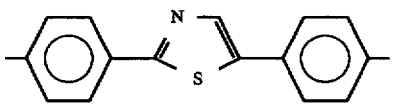

or

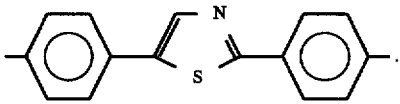

2. A composition according to claim 1, which contains 0.1–30 wt. % of a mesomorphic compound of the formula (A) and 0.1–30 wt. % of a mesomorphic compound of the formula (B).

3. A composition according to claim 1, which has chiral smectic C phase in which said liquid crystal composition shows a layer inclination angle δ of 3–15 degrees in a temperature range of 0°–60° C.

4. A composition according to claim 1, which contains at least one mesomorphic compound selected from mesomorphic compounds represented by the following formulae (1)–(5):

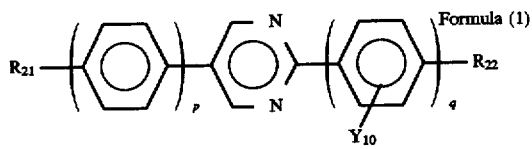

Formula (1)

wherein p and q independently denote 0, 1 or 2 satisfying p+q=1 or 2; $Y_{10}$ is hydrogen or fluorine; and $R_{21}$ and $R_{22}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other;

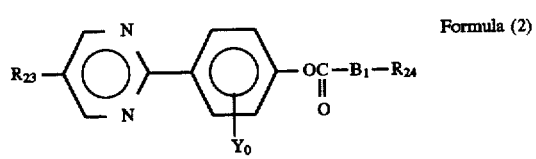

Formula (2)

wherein $B_1$ is

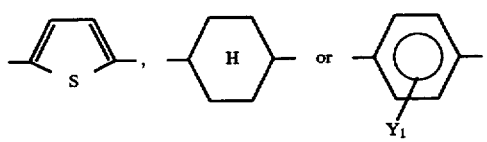

where $Y_1$ is hydrogen or fluorine; $Y_0$ is hydrogen or fluorine; $R_{23}$ is a linear or branched alkyl group having 1–18 carbon atoms; $R_{24}$ is hydrogen, halogen, CN, or a linear or branched alkyl group having 1–18 carbon atoms; and at least one methylene group in the alkyl group of $R_{23}$ or $R_{24}$ can be replaced by —O—, —S—, —CO—, —CH=CH—, —C≡C—, or —CHW— where W is halogen, CN or $CF_3$ provided that heteroatoms are not adjacent to each other;

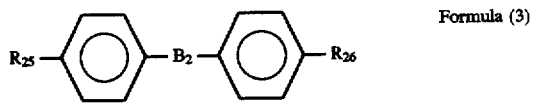

Formula (3)

wherein $B_2$ is

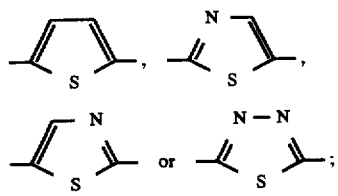

and $R_{25}$ and $R_{26}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other; and

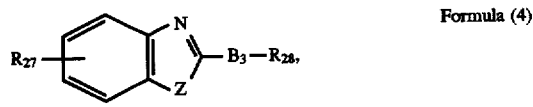

Formula (4)

wherein $B_3$ is

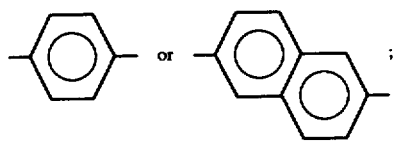

and $R_{27}$ and $R_{28}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other; and

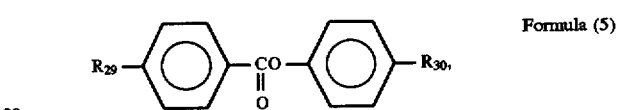

Formula (5)

wherein $R_{29}$ and $R_{30}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other.

5. A composition according to claim 4, wherein each component of said at least one mesomorphic compound is contained in the liquid crystal composition in an amount shown below:

(a) 20–75 wt. % for the mesomorphic compound of the formula (1), (b) 5–25 wt. % for the mesomorphic compound of the formula (2), (c) 5–30 wt. % for the mesomorphic compound of the formula (3), (d) 0.1–30 wt. % for the mesomorphic compound of the formula (4), or (e) 1–25 wt. % for the mesomorphic compound of the formula (5).

6. A composition according to claim 4, wherein:

said mesomorphic compound of the formula (1) includes at least one species of mesomorphic compounds of the formulae (1-1) to (1-7); said mesomorphic compound of the formula (2) includes at least one species of mesomorphic compounds of the formulae (2-1) to (2-5); said mesomorphic compound of the formula (3) includes at least one species of mesomorphic compounds of the formulae (3-1) to (3-9); and said mesomorphic compound of the formula (4) includes at least one species of mesomorphic compounds of the formulae (4-1) to (4-6), respectively shown below:

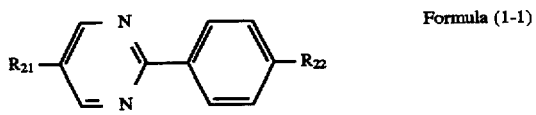

Formula (1-1)

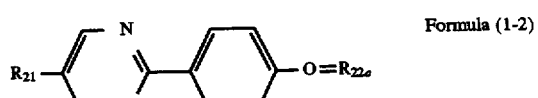

Formula (1-2)

-continued

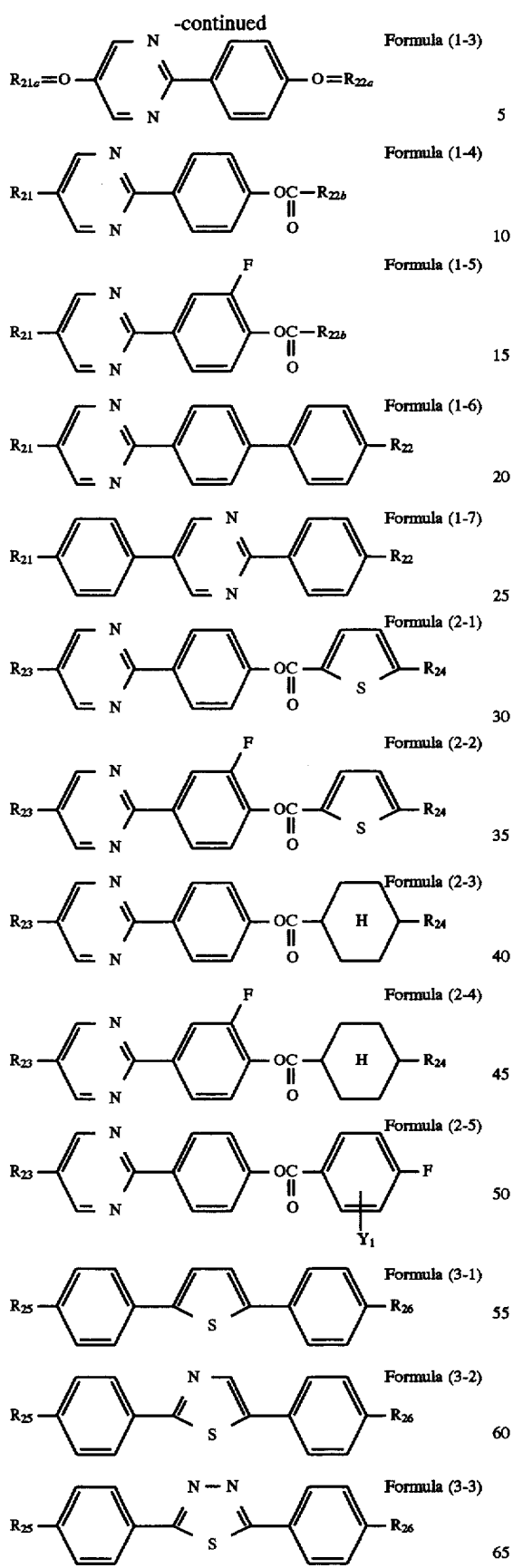

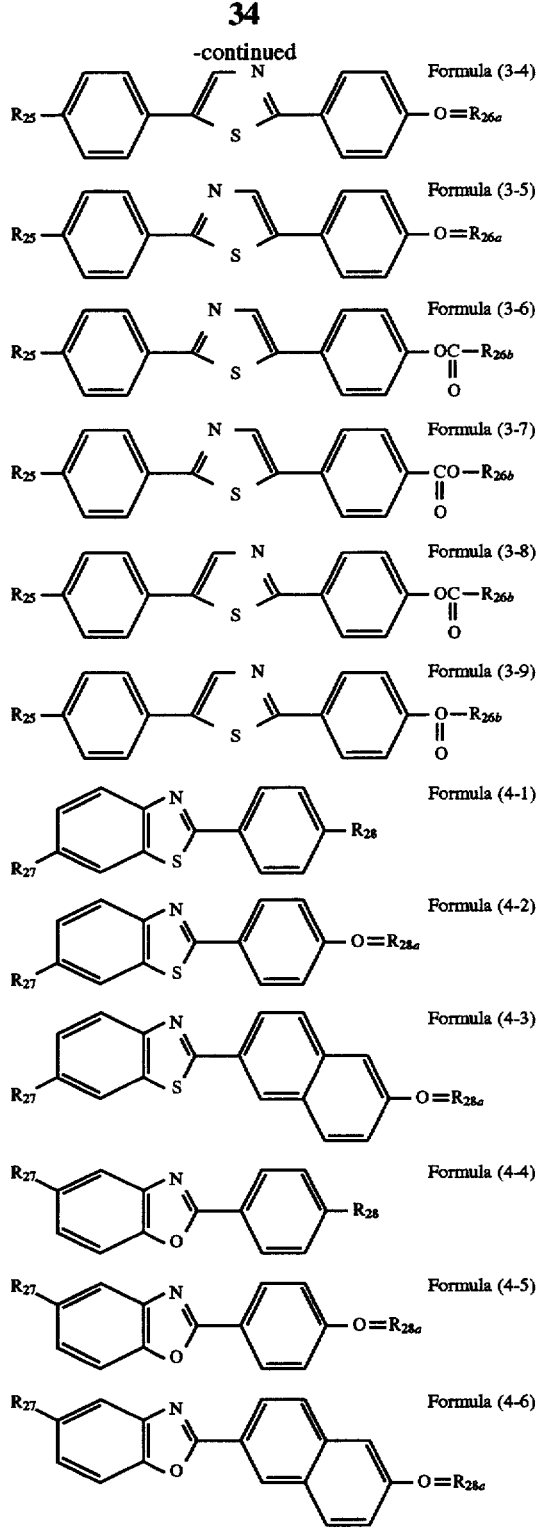

wherein $R_{21a}$, $R_{22a}$, $R_{26a}$, and $R_{28a}$ independently denote a linear or branched alkyl group having 1–17 carbon atoms; and $R_{22b}$ and $R_{26b}$ independently denote a linear or branched alkyl group having 1–16 carbon atoms.

7. A liquid crystal device, comprising: a pair of substrates each provided with an electrode, and a liquid crystal composition according to any one of claims 1–6.

8. A device according to claim 7, which comprises an alignment control layer which is disposed on at least one of said pair of substrates and is provided with a uniaxial alignment axis.

9. A device according to claim 8, wherein said alignment control layer provided with a uniaxial alignment axis is disposed on both of said pair of substrates and the respective uniaxial alignment axes intersect with each other at a prescribed crossing angle.

10. A device according to claim 7, wherein said device provides a pretilt angle a and said liquid crystal composition is a chiral smectic liquid crystal composition placed in such an alignment state that the chiral smectic liquid crystal shows a cone angle $\textcircled{H}$, a layer inclination angle $\delta$ in chiral smectic C phase, and an apparent tilt angle $\theta a$ satisfying the following relationships (I), (II) and (III) in combination with the pretilt angle $\alpha$:

$$\textcircled{H} < \alpha + \delta, \quad (I)$$

$$\delta < \alpha, \quad (II)$$

and $$\textcircled{H} > \theta a > \textcircled{H}/2 \quad (III).$$

11. A device according to claim 9, wherein said crossing angle is at most 25 degrees.

12. A device according to claim 10, wherein said pretilt angle is at least 5 degrees.

13. A liquid crystal apparatus, including: a liquid crystal device according to claim 7.

14. An apparatus according to claim 13, which includes a drive circuit for driving the liquid crystal device.

15. An apparatus according to claim 13, which includes a light source.

* * * * *

UNITED STATES PATENT AND TRADEMARK OFFICE
CERTIFICATE OF CORRECTION

PATENT NO. : 5,709,818

DATED : January 20, 1998

INVENTOR(S): MASATAKA YAMASHITA ET AL.

It is certified that error appears in the above-identified patent and that said Letters Patent is hereby corrected as shown below:

COLUMN 1

Line 12, "two-types" should read --two types--.
Line 36, "case" should read --cases--.

COLUMN 2

Line 27, "have" should read --has--.

COLUMN 3

Line 35, "instances," should read --instance,--.

COLUMN 5

Line 36, "θ" should read --δ--.

COLUMN 6

Line 9, "when" should read --with--.
Line 34, "θ" should read --δ--.

COLUMN 8

Line 22, "may" should read --may be--.

COLUMN 11

Line 11, "another" should read --other--.

UNITED STATES PATENT AND TRADEMARK OFFICE
CERTIFICATE OF CORRECTION

PATENT NO. : 5,709,818

DATED : January 20, 1998

INVENTOR(S) : MASATAKA YAMASHITA ET AL.

It is certified that error appears in the above-identified patent and that said Letters Patent is hereby corrected as shown below:

COLUMN 12

Line 39, "an" should be deleted.
Line 40, "another" should read --other--.

COLUMN 15

Line 13, "device. The" should read --device, the--.
Line 20, "θ" should read --δ--.
Line 35, "provides" should read --provide--.

COLUMN 17

Line 3, "films" should read --film--.
Line 18, "one" should read --one of--.

COLUMN 19

Line 12, "polarizes" should read --polarizers--.

COLUMN 21

Line 24, "a" should be deleted.

UNITED STATES PATENT AND TRADEMARK OFFICE
CERTIFICATE OF CORRECTION

PATENT NO. : 5,709,818

DATED : January 20, 1998

INVENTOR(S): MASATAKA YAMASHITA ET AL.

It is certified that error appears in the above-identified patent and that said Letters Patent is hereby corrected as shown below:

COLUMN 22

Line 67, "a" should be deleted.

COLUMN 23

Line 5, "a an" should read --at an--.

COLUMN 24

Line 47, "a" should be deleted.

COLUMN 26

Line 41, "a" should be deleted.

COLUMN 29

Line 23, "Table," should read --Table 3,--.

UNITED STATES PATENT AND TRADEMARK OFFICE
CERTIFICATE OF CORRECTION

PATENT NO. : 5,709,818

DATED : January 20, 1998

INVENTOR(S) : MASATAKA YAMASHITA ET AL.

It is certified that error appears in the above-identified patent and that said Letters Patent is hereby corrected as shown below:

<u>COLUMN 36</u>

Line 3, "(III)." should be flush right.

Signed and Sealed this

Eleventh Day of August 1998

Attest:

Attesting Officer

BRUCE LEHMAN

Commissioner of Patents and Trademarks